United States Patent
Kim

(10) Patent No.: US 8,180,314 B2
(45) Date of Patent: *May 15, 2012

(54) METHOD AND SYSTEM FOR UTILIZING GIVENS ROTATION TO REDUCE FEEDBACK INFORMATION OVERHEAD

(75) Inventor: Joonsuk Kim, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 763 days.

This patent is subject to a terminal disclaimer.

(21) Appl. No.: 11/450,818

(22) Filed: Jun. 9, 2006

(65) Prior Publication Data

US 2007/0213013 A1    Sep. 13, 2007

Related U.S. Application Data

(60) Provisional application No. 60/780,157, filed on Mar. 8, 2006.

(51) Int. Cl.
*H04W 4/00* (2009.01)
*H04K 1/10* (2006.01)

(52) U.S. Cl. ..................... 455/338; 375/260

(58) Field of Classification Search ............... 375/260, 375/267, 226, 340, 229, 341; 455/69; 370/329, 370/335, 332, 338
See application file for complete search history.

(56) References Cited

U.S. PATENT DOCUMENTS

2006/0039489 A1* 2/2006 Ikram et al. ............. 375/260
2008/0108310 A1* 5/2008 Tong et al. ............... 455/69

* cited by examiner

*Primary Examiner* — Michael Faragalla
(74) *Attorney, Agent, or Firm* — Garlick & Markison; Holly L. Rudnick

(57) ABSTRACT

Aspects of a method and system for utilizing Givens rotation to reduce feedback information overhead are presented. Aspects of the system may include a receiver that may enable computation of a beamforming matrix for signals received from a transmitter in a multiple input multiple output (MIMO) communication system. The receiver may enable computation of Givens rotation angles and/or phase rotation angles based on the computed beamforming matrix. The receiver may also enable feedback of information containing the Givens rotation angles and/or phase rotation angles to the transmitter.

20 Claims, 6 Drawing Sheets

Feedback Information ($H_{down}$)

METHOD AND SYSTEM FOR UTILIZING GIVENS ROTATION TO REDUCE FEEDBACK INFORMATION OVERHEAD

CROSS-REFERENCE TO RELATED APPLICATIONS/INCORPORATION BY REFERENCE

This application makes reference, claims priority to, and claims the benefit of U.S. Provisional Application Ser. No. 60/780,157 filed Mar. 8, 2006.

This application makes reference to:
U.S. patent application Ser. No. 11/327,752, filed on Jan. 6, 2006;
U.S. patent application Ser. No. 11/327,690, filed on Jan. 6, 2006; and
U.S. application Ser. No. 11/052,389 filed Feb. 7, 2005.

All of the above stated applications are hereby incorporated herein by reference in their entirety.

FIELD OF THE INVENTION

Certain embodiments of the invention relate to wireless communication. More specifically, certain embodiments of the invention relate to a method and system for utilizing Givens rotation to reduce feedback information overhead.

BACKGROUND OF THE INVENTION

Multiple input multiple output (MIMO) systems are wireless communications systems that are specified in resolution 802.11 from the Institute of Electrical and Electronics Engineers (IEEE). A MIMO system that receives a signal Y may compute a channel estimate matrix, H, based on the received signal. The signal may comprise information generated from a plurality of information sources. Each such information source may be referred to as a spatial stream. A transmitting MIMO system may utilize a plurality of transmitting antennas when transmitting the signal Y. A receiving MIMO system may utilize a plurality of receiving antennas when receiving the signal Y. The channel estimate matrix for a downlink RF channel, $H_{down}$, may describe a characteristic of the wireless transmission medium in the transmission path from a transmitter, to a receiver. The channel estimate for an uplink RF channel, $H_{up}$, may describe a characteristic of the wireless transmission medium in the transmission path from the receiver to the transmitter.

According to the principle of reciprocity, a characteristic of the wireless transmission medium in the transmission path from the transmitter to the receiver may be assumed to be identical to a corresponding characteristic of the wireless transmission medium in the transmission path from the receiver to the transmitter. However, the channel estimate matrix $H_{down}$ may not be equal to a corresponding channel estimate matrix for an uplink RF channel $H_{up}$. For example, a noise level, for example an ambient noise level, in the vicinity of the transmitter may differ from a noise level in the vicinity of the receiver. Similarly, an interference level, for example electro-magnetic interference due to other electromagnetic devices, in the vicinity of the transmitter may differ from an interference level in the vicinity of the receiver. At a transmitter, or receiver, there may also be electrical cross-coupling, for example leakage currents, between circuitry associated with a receiving antenna, or a transmitting antenna, and circuitry associated with another receiving antenna, or another transmitting antenna.

The principle of reciprocity, wherein it may be assumed that $H_{up}=H_{down}$, may also be based on the assumption that specific antennas at a transmitter or receiver are assigned for use as transmitting antennas, and/or assigned for use as receiving antennas. At the transmitter, a number of receiving antennas, NRX, utilized at the receiver may be assumed. At the receiver, a number of transmitting antennas, NTX, utilized at the transmitter may be assumed. If the assignments of at least a portion of the antennas at the transmitter are changed, the corresponding channel estimate matrix $H'_{down}$ may not be equal $H_{down}$. Similarly, if the assignments of at least a portion of the antennas at the receiver are changed, the corresponding channel estimate matrix $H'_{up}$ may not be equal $H_{up}$. Consequently, after reassignment of antennas at the transmitter and/or receiver, the principle of reciprocity may not be utilized to characterize communications between the transmitter and the receiver when $H_{up}$ does not equal $H'_{down}$, when $H'_{up}$ does not equal $H_{down}$, or when $H'_{up}$ does not equal $H'_{down}$.

The principle of reciprocity may enable a receiving wireless local area network (WLAN) device A to receive a signal Y from a transmitting WLAN device B, and to estimate a channel estimate matrix $H_{down}$ for the transmission path from the transmitting WLAN device B to the receiving WLAN device A. Based on the channel estimate matrix $H_{down}$, the WLAN device A may transmit a subsequent signal Y, via an uplink RF channel, to the WLAN device B based on the assumption that the channel estimate matrix $H_{up}$ for the transmission path from the transmitting WLAN device A to the receiving WLAN device B may be characterized by the relationship $H_{up}=H_{down}$. When the WLAN devices A and B are MIMO systems, corresponding beamforming matrices may be configured and utilized for transmitting and/or receiving signals at each WLAN device.

Beamforming is a method for signal processing that may allow a transmitting MIMO system to combine a plurality of spatial streams in a transmitted signal Y. Beamforming is also a method for signal processing that may allow a receiving MIMO system to separate individual spatial streams in a received signal Y.

As a result of a failure of an assumed condition for the principle of reciprocity, a beamforming matrix at the transmitting WLAN device, and/or a beamforming matrix at the receiving WLAN device, may be configured incorrectly. In a transmitted signal Y, from the perspective of a signal associated with an $i^{th}$ spatial stream, a signal associated with a $j^{th}$ spatial stream may represent interference or noise. Incorrect configuration of one or more beamforming matrices may reduce the ability of the receiving WLAN device to cancel interference between an $i^{th}$ spatial stream and a $j^{th}$ spatial stream. Consequently, the received signal Y may be characterized by reduced signal to noise ratios (SNR). There may also be an elevated packet error rate (PER) when the receiving WLAN device decodes information contained in the received signal Y. This may, in turn, result in a reduced information transfer rate, as measured in bits/second, for communications between the transmitting WLAN device and the receiving WLAN device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for utilizing Givens rotation to reduce feedback information overhead, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for utilizing Givens rotation to reduce feedback information overhead. Various embodiments of the invention utilize computed Givens rotation angles and phase shift angles to represent feedback information in a matrix format. The quantity of data, as measured in bytes for example, when utilizing this representation may be less than a quantity of data required when utilizing some conventional methods for feedback information representation. In various embodiments of the invention, the Givens rotation angles and phase shift angles may be grouped according to carrier frequency. The carrier frequencies, which may be associated with an RF channel, may be sorted in a specified order. The groups of Givens rotation angles and phase shift angles may be transmitted in feedback information in an order which may correspond to the sorted order of the carrier frequencies.

Figure 1:
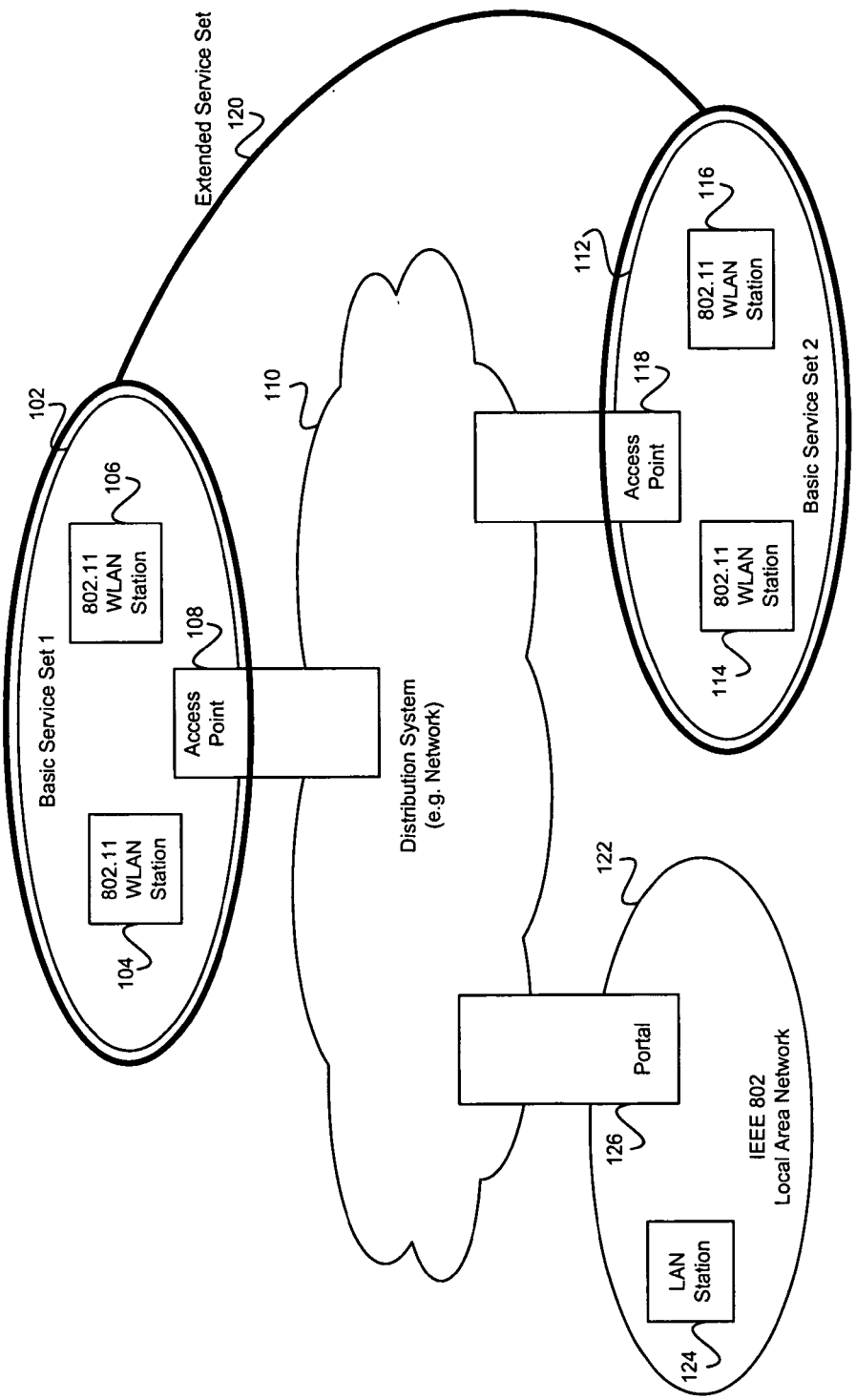
FIG. 1 is a block diagram of an exemplary system for wireless data communications, which may be utilized in connection with an embodiment of the invention.

FIG. 1 is a block diagram of an exemplary system for wireless data communications, which may be utilized in connection with an embodiment of the invention. With reference to FIG. 1 there is shown a distribution system (DS) 110, an extended service set (ESS) 120, and an IEEE 802.x LAN 122. The ESS 120 may comprise a first basic service set (BSS) 102, and a second BSS 112. The first BSS 102 may comprise a first 802.11 WLAN station 104, a second 802.11 WLAN station 106, and an access point (AP) 108. The second BSS 112 may comprise a first 802.11 WLAN station 114, a second 802.11 WLAN station 116, and an access point (AP) 118. The IEEE 802 LAN 122 may comprise a LAN station 124, and a portal 126. An IEEE 802.11 WLAN station, or IEEE 802.11 WLAN device, is a WLAN system that may be compliant with at least a portion of the IEEE 802.11 standard.

A WLAN is a communications networking environment that comprises a plurality of WLAN devices that may communicate wirelessly via one or more uplink and/or downlink RF channels. The BSS 102 or 112 may be part of an IEEE 802.11 WLAN that comprises at least 2 IEEE 802.11 WLAN stations, for example, the first 802.11 WLAN station 104, the second 802.11 WLAN station 106, and the AP 108, which may be members of the BSS 102. Non-AP stations within BSS 102, the first 802.11 WLAN station 104, and the second 802.11 WLAN station 106, may individually form an association with the AP 108. An AP, such as AP 108, may be implemented as an Ethernet switch, bridge, or other device in a WLAN, for example. Similarly, non-AP stations within BSS 112, the first 802.11 WLAN station 114, and the second 802.11 WLAN station 116, may individually form an association with the AP 118. Once an association has been formed between a first 802.11 WLAN station 104 and an AP 108, the AP 108 may communicate reachability information about the first 802.11 WLAN station 104 to other APs associated with the ESS 120, such as AP 118, and portals such as the portal 126. The WLAN station 104 may subsequently communicate information wirelessly via the BSS 102. In turn, the AP 118 may communicate reachability information about the first 802.11 WLAN station 104 to stations in BSS 112. The portal 126, which may be implemented as, for example, an Ethernet switch or other device in a LAN, may communicate reachability information about the first 802.11 WLAN station 104 to stations in LAN 122 such as the 802 LAN station 124. The communication of reachability information about the first 802.11 WLAN station 104 may enable WLAN stations that are not in BSS 102, but are associated with ESS 120, to communicate wirelessly with the first 802.11 WLAN station 104.

The DS 110 may provide an infrastructure which enables a first 802.11 WLAN station 104 in one BSS 102, to communicate wirelessly with a first 802.11 WLAN station 114 in another BSS 112. The DS 110 may also enable a first 802.11 WLAN station 104 in one BSS 102 to communicate with an 802 LAN station 124 in an IEEE 802 LAN 122, implemented as, for example a wired LAN. The AP 108, AP 118, or portal 126 may provide a means by which a station in a BSS 102, BSS 112, or LAN 122 may communicate information via the DS 110. The first 802.11 WLAN station 104 in BSS 102 may communicate information wirelessly to a first 802.11 WLAN station 114 in BSS 112 by transmitting the information wirelessly to AP 108, which may transmit the information via the DS 110 to AP 118, which in turn may transmit the information wirelessly to station 114 in BSS 112. The first 802.11 WLAN station 104 may communicate information wirelessly to the 802 LAN station 124 in LAN 122 by transmitting the information wirelessly to AP 108, which may transmit the information via the DS 110 to the portal 126, which in turn may transmit the information to the 802 LAN station 124 in LAN 122. The DS 110 may utilize wireless communications via an RF channel, wired communications, such as IEEE 802 Ethernet, or a combination thereof.

A WLAN station or AP may utilize one or more transmitting antennas, and one or more receiving antennas when communicating information. A WLAN station or AP that utilizes a plurality of transmitting antennas and/or a plurality of receiving antennas may be referred to as a multiple input multiple output (MIMO) system.

Figure 2:
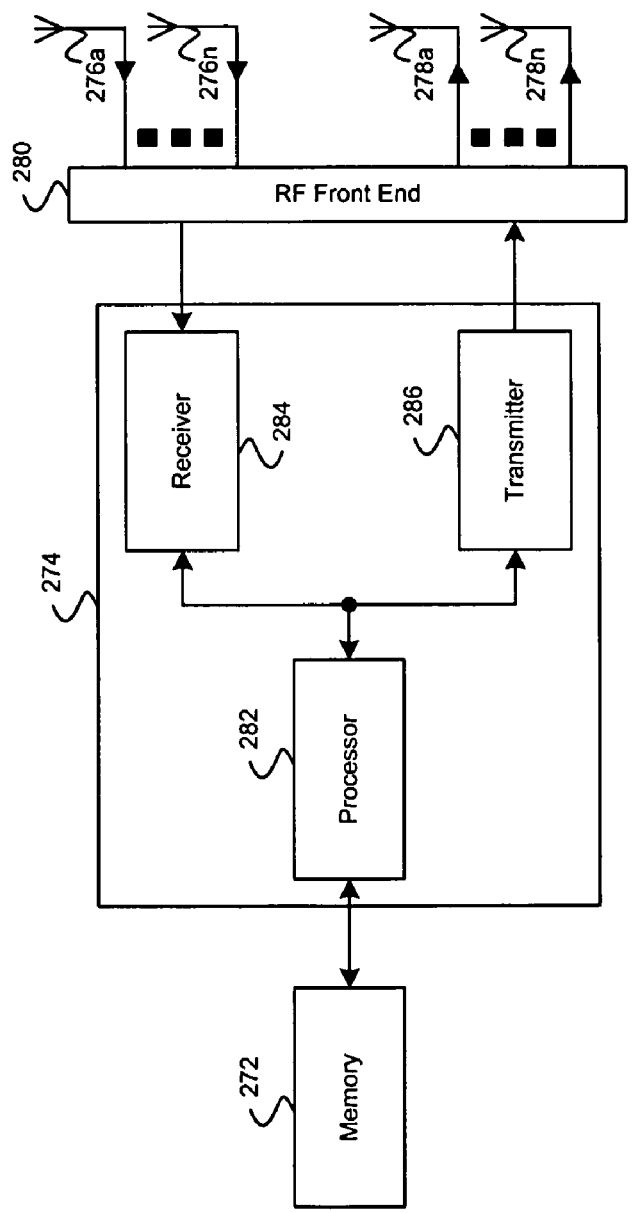
FIG. 2 is a block diagram of an exemplary MIMO system that may be utilized in connection with an embodiment of the invention.

FIG. 2 is a block diagram of an exemplary MIMO system that may be utilized in connection with an embodiment of the invention. With reference to FIG. 2 there is shown a memory 272, a transceiver 274, an RF front end 280, a plurality of receiving antennas $276a, \ldots, 276n$, and a plurality of transmitting antennas $278a, \ldots, 278n$. The transceiver 274 may comprise a processor 282, a receiver 284, and a transmitter 286.

The processor 282 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. These functions may comprise, but are not limited to, tasks related to analysis of data received via the receiver 284, and tasks related to generating data to be transmitted via the transmitter 286. These tasks may further comprise medium access control (MAC) layer functions as specified by pertinent standards. The memory 272 may be utilized to store data and/or code, and/or utilized to retrieve data and/or code. The memory 272 may receive data and/or code via input signals along with input control signals that enable the memory 272 to store the received data and/or code. The memory 272 may receive input control signals the enable the memory 272 to output data and/or code that was previously stored. The memory 272 may receive input control signals that enable the memory 272 to delete data and/or code that was previously stored.

The receiver 284 may perform digital receiver functions that may comprise, but are not limited to, fast Fourier transform processing, beamforming processing, equalization, demapping, demodulation control, deinterleaving, depuncture, and decoding. The transmitter 286 may perform digital transmitter functions that comprise, but are not limited to, coding, puncture, interleaving, mapping, modulation control, inverse fast Fourier transform processing, beamforming processing. The RF front end 280 may receive analog RF signals via antennas 276a, . . . , 276n, converting the RF signal to baseband and generating a digital equivalent of the received analog baseband signal. The digital representation may be a complex quantity comprising I and Q components. The RF front end 280 may also transmit analog RF signals via an antenna 278a, . . . , 278n, converting a digital baseband signal to an analog RF signal.

In operation, the processor 282 may receive data from the receiver 284. The processor 282 may perform analysis and further processing and the received data. The processor 282 may store at least a portion of the received data and/or processed data in the memory 272. The processor 282 may generate a plurality of bits that are communicated to the receiver 284. The processor 282 may also communicate signals to the memory 272 that enable the memory to communicate a plurality of bits to the receiver 284. The processor 282 may generate signals to control the operation of the modulation process in the transmitter 286, and of the demodulation process in the receiver 284. The processor 282 may compute weights that may be utilized for beamforming at the transmitter 286, and/or that may be utilized for detection at the receiver 284. In performing the computation task, the processor 282 may utilized code that is stored in the memory 272. The processor 282 may store and/or retrieve information stored in the memory 272 related to transmitter impairments, for example EVM. The processor 282 may utilize transmitter impairment information when computing weights for the transmitter 286 and/or receiver 284.

Figure 3A:
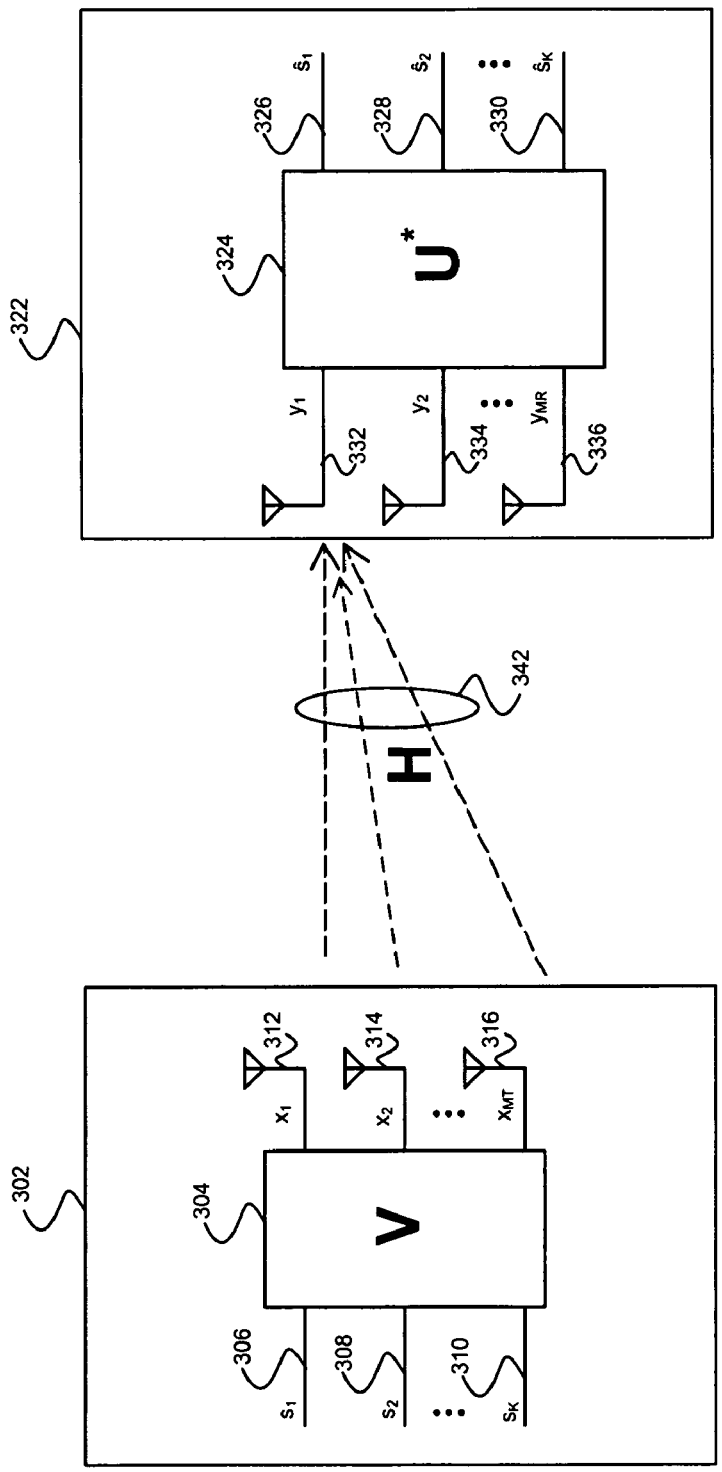
FIG. 3A is an exemplary diagram illustrating beamforming that may be utilized in connection with an embodiment of the invention.

FIG. 3A is an exemplary diagram illustrating beamforming that may be utilized in connection with an embodiment of the invention. Referring to FIG. 3A there is shown a transmitting mobile terminal 302, a receiving mobile terminal 322, and a plurality of RF channels 342. The transmitting mobile terminal 302 comprises a transmit filter coefficient block V 304, and a plurality of spatial streams $s_1$ 306, $s_2$ 308, and $s_K$ 310, where K may represent a number of spatial streams transmitted by the transmitting mobile terminal 302. The transmitting mobile terminal may further comprise a plurality of transmitting antennas 312, 314, and 316. The number of transmitting antennas may be represented by the variable N. The receiving mobile terminal 322 comprises a receive filter coefficient block U* 324, a plurality of destination streams $\hat{s}_1$ 326, $\hat{s}_2$ 328, and $\hat{s}_K$ 330, and a plurality of receiving antennas 332, 334, and 336. The number of receiving antennas may be represented by the variable M. An exemplary mobile terminal may be a WLAN station 104, for example.

In operation, the transmitting antenna 312 may enable transmission of a signal $x_1$, the transmitting antenna 314 may enable transmission of a signal $x_2$, and the transmitting antenna 316 may enable transmission of a signal $x_N$. In a beamforming operation, each of the transmitted signals $x_1$, $x_2$, . . . , $x_N$ may be a function of a weighted summation of at least one of the plurality of the spatial streams $s_1$, $s_2$, . . . , $s_K$. The weights may be determined by a beamforming matrix V in connection with the transmit coefficient filter block 304.

The receiving antenna 332 may receive a signal $y_1$, the receiving antenna 334 may receive a signal $y_2$, and the receiving antenna 336 may receive a signal $y_M$. The plurality of RF channels 342 may be characterized mathematically by a transfer coefficient matrix H. The transfer coefficient matrix H may also be referred to as a channel estimate matrix.

In a MIMO system that utilizes beamforming, the values associated with the matrices V, H, and U* may be such that the value of the transmitted signal $s_i$ may be approximately equal to the value of the corresponding received signal $\tilde{y}_i$, where the index i may indicate an $i^{th}$ spatial stream. The receiver 322 may compute a channel estimate, $H_{down}$, for a downlink RF channel based on a received signal from the transmitter 302. The transmitter 302 may compute a channel estimate, $H_{up}$, for an uplink RF channel based on a received signal from the receiver 322. In the absence of feedback information received from the receiver 322, the transmitter may assume channel reciprocity. The transmit coefficient filter block 304 may set values for matrix elements associated with the matrix V, utilized for communications via the downlink RF channel, based on the channel estimate $H_{up}$.

When the receiver 322 sends feedback information to the transmitter 302 via the uplink RF channel, the receiver 322 may compute values associated with a matrix V that may be based on the channel estimate $H_{down}$. The receiver 322 may subsequently communicate the computed matrix V to the transmitter 302 via the uplink RF channel. The transmitter 302 may subsequently set values for matrix elements associated with the matrix V, utilized for communications via the downlink RF channel, based on the channel estimate $H_{down}$.

Figure 3B:
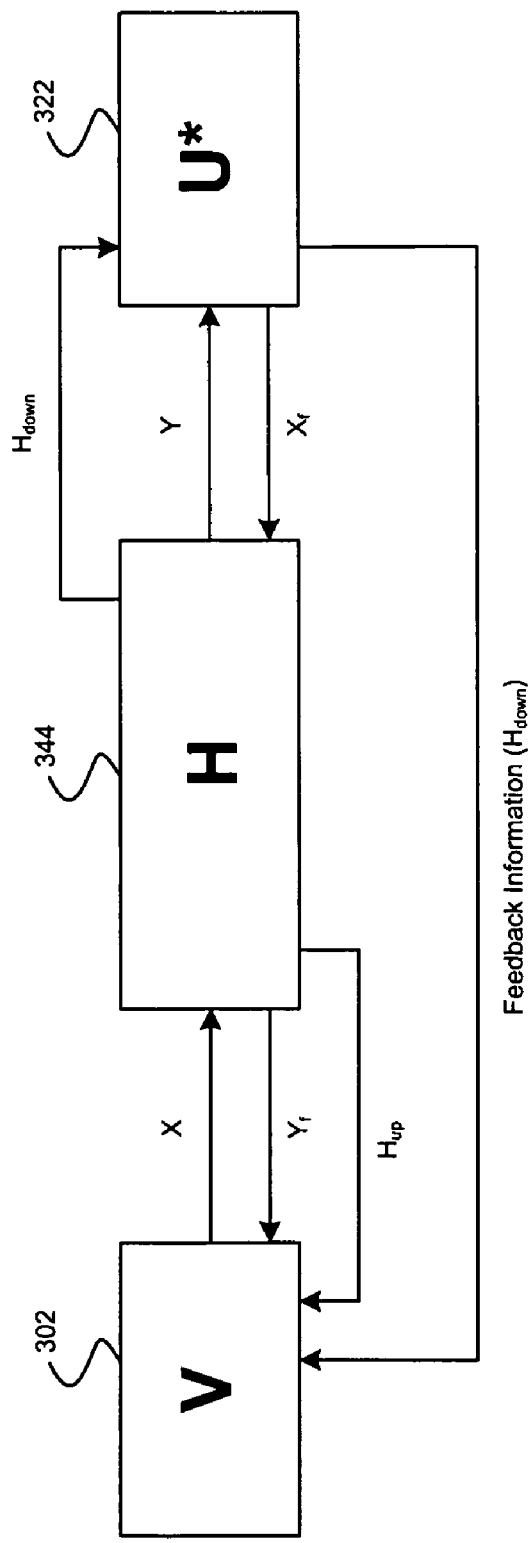
FIG. 3B is an exemplary diagram illustrating channel feedback, which may be utilized in connection with an embodiment of the invention.

FIG. 3B is an exemplary diagram illustrating channel feedback, which may be utilized in connection with an embodiment of the invention. Referring to FIG. 3B, there is shown a transmitting mobile terminal 302, a receiving mobile terminal 322, and a communications medium 344. The communications medium 344 may represent a wireless communications medium. The transmitting mobile terminal 302 may transmit a signal vector X to the receiving mobile terminal 322 via the communications medium 344. The communications direction from the transmitting mobile terminal 302 to the receiving mobile terminal 322 may be referred to as a downlink direction. The signal vector X may comprise a plurality of spatial streams simultaneously transmitted via transmitting antennas 312, 314 and 316, for example. The signal vector X may be beamformed by the transmitting mobile terminal 302 based on a beamforming matrix V. The signal vector X may travel through the communications medium 344. The signal vector X may be altered while traveling through the communications medium 344. The transmission characteristics associated with the communications medium 344 may be characterized by a transfer function H. The signal vector X may be altered based on the transfer function H. In the downlink direction, the transfer function H may be referred to as $H_{down}$. The altered signal vector X may be represented as the signal Y. The receiving mobile terminal 322 may receive the signal Y. The receiving mobile terminal 322 may determine one or more values associated with the transfer function $H_{down}$ based on the signal Y received via the communications medium 344.

The receiving mobile terminal 322 may compute one or more values associated with a matrix V based on the information related to the transfer function $H_{down}$. The receiving mobile terminal 322 may communicate information related to the matrix V to the transmitting mobile terminal 302 as feedback information. The feedback information ($H_{down}$) may represent feedback information based on the information related to the transfer function $H_{down}$. The receiving mobile terminal 322 may communicate the feedback information ($H_{down}$) via a transmitted signal vector $X_f$. The transmitted signal vector $X_f$ may be transmitted to the transmitting mobile terminal 302 via the communications medium 344. The signal vector $X_f$ may be altered while traveling through the communications medium 344. The communications direction from the receiving mobile terminal 322 to the transmitting mobile terminal 302 may be referred to as an uplink direction. The signal vector $X_f$ may be altered based on the transfer function H. In the uplink direction, the transfer function H may be referred to as $H_{up}$. The altered signal vector $X_f$ may be represented as the signal $Y_f$. The transmitting mobile terminal 302 may receive the signal $Y_f$.

The transmitting mobile terminal 302 may determine one or more values associated with the transfer function $H_{up}$ based on the signal $Y_f$ received via the communications medium 344. The transmitting mobile terminal 302 may utilize the received feedback information ($H_{down}$) to beamform subsequent signal vectors X, which may be transmitted in the downlink direction from the transmitting mobile terminal 302 to the receiving mobile terminal 322.

Figure 4:
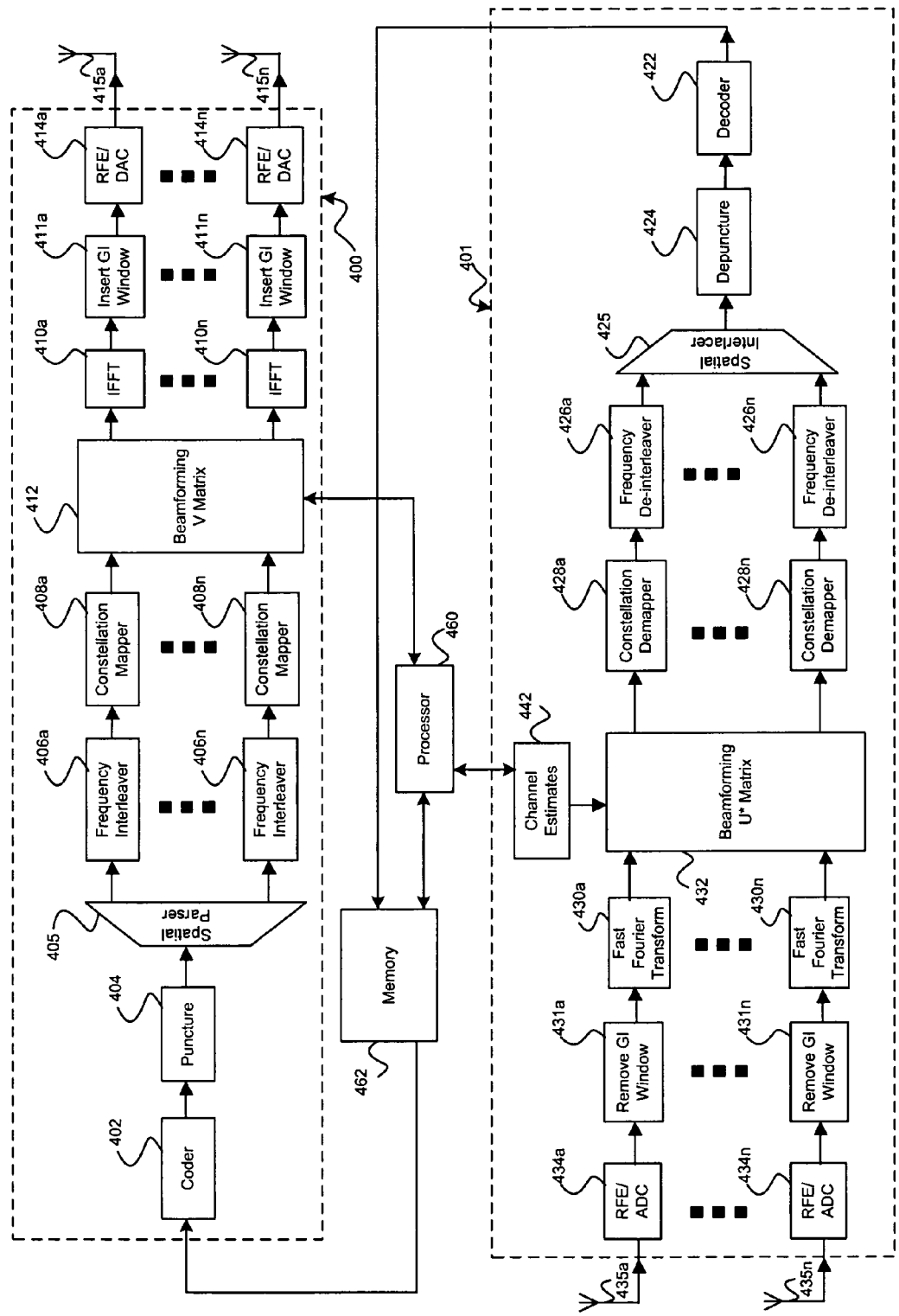
FIG. 4 is an exemplary block diagram of a transceiver comprising a transmitter and receiver in a MIMO system, in accordance with an embodiment of the invention.

FIG. 4 is an exemplary block diagram of a transceiver comprising a transmitter and receiver in a MIMO system, in accordance with an embodiment of the invention. Referring to FIG. 4, there is shown a transmitter 400, a processor 460, a memory 462, a plurality of transmitting antennas 415a, . . . , 415n, a receiver 401, and a plurality of receiving antennas 435a, . . . , 435n. The transmitter 400 may comprise a coder block 402, a puncture block 404, spatial parser block 405, a plurality of frequency interleaver blocks 406a, . . . , 406n, a plurality of constellation mapper blocks 408a, . . . , 408n, a beamforming V matrix block 412, a plurality of inverse fast Fourier transform (IFFT) blocks 410a, . . . , 410n, a plurality of insert guard interval (GI) window blocks 411a, . . . , 411n, and a plurality of radio front end with digital to analog conversion (RFE/DAC) blocks 414a, . . . , 414n. In various embodiments of the invention a WLAN station 104 may comprise a transceiver, as shown in FIG. 4. Alternatively, the WLAN station 104 may comprise and/or utilize separate transmitter 400 and receiver 401 components.

The receiver 401 may comprise a plurality of radio front end with analog to digital conversion (RFE/ADC) blocks 434a, . . . , 434n, a plurality of remove GI window blocks 431a, . . . , 431n, a plurality of fast Fourier transform (FFT) blocks 430a, . . . , 430n, a channel estimates block 443, a beamforming U* matrix block 432, a plurality of constellation demapper blocks 428a, . . . , 428n, a plurality of frequency de-interleaver blocks 426a, . . . , 426n, a spatial interlacer block 425, a depuncture block 424, and a decoder block 422.

The transmitter 400 may comprise suitable logic, circuitry, and/or code that may enable the concurrent transmission of an ordered plurality of signals, substantially as shown for the transmitter 286. The receiver 401 may comprise suitable logic, circuitry, and/or code that may enable the concurrent reception of an ordered plurality of signals, substantially as shown for the receiver 284.

The coder block 402 may comprise suitable logic, circuitry, and/or code that may enable transformation of received binary input data blocks by applying a forward error correction (FEC) technique, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in the binary input data block to the number of bits in the transformed data block may be known as the "coding rate". The coding rate, R, may be specified using the notation $i_b/t_b$, where $t_b$ represents the total number of bits that comprise a coding group of bits, while $i_b$ represents the number of information bits that are contained in the group of bits $t_b$. Any number of bits $t_b - i_b$ may represent redundant bits that may enable the receiver 284 to detect and correct errors introduced during transmission of information from the transmitter 302 to the receiver 322 via a wireless communication medium 342, for example.

Increasing the number of redundant bits may enable greater capabilities at the receiver to detect and correct errors in received information bits. Increasing the number of redundant bits may increase the value of $t_b$ without increasing the number of information bits $i_b$, and correspondingly reduce the coding rate, R. The resulting lower coding rate, R, may be referred to as a "stronger" coding rate in comparison to a higher coding rate, R. The stronger coding rate may also correspond to a stronger error protection scheme. The stronger error protection scheme may correspondingly enable greater capabilities at the receiver to detect and correct errors in received information bits. Decreasing the number of redundant bits may decrease the value of $t_b$ without decreasing the number of information bits $i_b$, and correspondingly increase the coding rate, R. The resulting higher coding rate, R, may be referred to as a "weaker" coding rate in comparison to a lower coding rate, R.

The invention is not limited to BCC, and any one of a plurality of coding techniques, for example, Turbo coding, low density parity check (LDPC) coding, and/or various block coding techniques such as Reed-Solomon FEC may also be utilized.

The puncture block 404 may comprise suitable logic, circuitry, and/or code that may enable alteration of a coding rate for received encoded data by removing redundant bits from the received transformed binary input data blocks. For example, for each contiguous block of 4 bits of received data that is encoded based on an R=½ coding rate BCC, the received data may comprise 2 information bits, and 2 redundant bits. By removing 1 of the redundant bits in the group of 4 received bits, the puncture block 304 may alter the coding rate from R=½ to R=⅔, for example.

The spatial parser block 405 may comprise suitable logic, circuitry, and/or code that may enable a block of data bits associated with a single bit stream to be divided into a plurality of parsed blocks of data bits, each of which may be associated with a corresponding plurality of parsed bit streams. Each of the parsed bit streams may be referred to as a spatial stream. A spatial stream may comprise an identifiable block of bits that may be processed within a MIMO system.

The spatial parser block 405 may receive the block of data bits associated with the single bit stream, $b_{db}$, and generate a plurality of parsed bit streams, $b_{sr}[i]$, where i may be an index identifying a specific parsed bit stream among the plurality of parsed bit streams. The range of values for the index i may be represented as follows:

$$1 \leq i \leq N_{ss} \qquad \text{equation[1]}$$

where $N_{SS}$ may represent a number of spatial streams, for example $N_{SS}=2$ may indicate a MIMO system that comprises 2 spatial streams.

Each of the parsed bit streams, $b_{sr}[i]$, may comprise a portion of the bits contained in the single bit stream $b_{db}$. The single bit stream $b_{db}$ may comprise the plurality of bits collectively contained in the corresponding plurality of parsed bit streams $b_{sr}[i]$.

Various embodiments of the invention may not be limited to a specific method for allocating bits from a single bit stream to a plurality of spatial streams. For example, given a block of $N_{TOT}$ bits received in a from a single bit stream, the spatial parser block 405 may assign about $N_{TOT}/N_{SS}$ bits to each of the plurality of $N_{SS}$ spatial streams. A first block of $N_{TOT}/N_{SS}$ bits from the bit stream $b_{db}$ may be assigned to spatial stream 1, a second block of $N_{TOT}/N_{SS}$ bits may be assigned to spatial stream 2, and an $N_{SS}{}^{th}$ block of $N_{TOT}/N_{SS}$ bits may be assigned to spatial stream $N_{SS}$, for example. Alternatively, a $k^{th}$ bit from the bit stream $b_{db}$, where k may represent an index for a bit in the block of data bits associated with the bit stream $b_{db}$, may be assigned to spatial stream i as indicated in the following equation, for example:

$$k_i = \text{floor}(k/N_{SS}) + k \bmod (N_{SS}) \qquad \text{equation[2]}$$

where $k_i$ may represent an index for a bit assigned to the $i^{th}$ spatial stream, floor(x) may represent an integer value that is not larger than the value x, and y mod(x) may represent the modulus x value for y.

The frequency interleaver block 406a may comprise suitable logic, circuitry, and/or code that may enable a rearrangement of an order of bits among a block of bits associated with a received spatial stream. The frequency interleaver block 406a may utilize a plurality of permutations when rearranging the order of bits among a block of bits associated with a received spatial stream. After rearrangement, the interleaved block of bits associated with the $i^{th}$ spatial stream, $b_{sr}[i]^{int}$, may be divided into a plurality of sub-blocks, $b_{sub}[f_k]$, where the index $f_k$ may represent a frequency carrier. The frequency carrier may correspond to one of a plurality of frequency carriers that may be utilized to transmit a representation of the bits contained in the sub-block via a wireless communication medium, for example. The representation of the bits may be referred to as a symbol. Each sub-block, $b_{sub}[f]$, may comprise a portion of bits in the block $b_{sr}[i]^{int}$. The block of bits $b^{sr}[i]^{int}$ may comprise the plurality of bits collectively contained in the corresponding plurality of sub-blocks $b_{sub}[f_k]$ for the range of values for k associated with the corresponding RF channel.

The frequency interleaver block 406n may comprise suitable logic, circuitry, and/or code that may enable a rearrangement of an order of bits among a block of bits associated with a received spatial stream, substantially as described for the frequency interleaver block 406a. In various embodiments of the invention, the number of frequency interleaver blocks 406a . . . 406n may be equal to the number of spatial streams, $N_{SS}$, for example.

The constellation mapper block 408a may comprise suitable logic, circuitry, and/or code that may enable a mapping of received bits, associated with a spatial stream, to one or more symbols. The received bits may be encoded based on an FEC, for example, and may be referred to as coded bits. The constellation mapper block 408a may receive one or more coded bits, $b_{sym}[f_k]$, and generate the symbol, sym[$f_k$], based on a modulation type associated with the spatial stream. The number of coded bits associated with $b_{sym}[f_k]$ may be determined based on the modulation type. The representation of the symbol, sym[$f_k$], may be a complex quantity comprising in-phase (I) and quadrature (Q) components. Each symbol, sym[$f_k$], associated with the one or more coded bits $b_{sym}[f_k]$ may be associated with a frequency carrier, $f_k$, where k may be an index that identifies a frequency associated with a $k^{th}$ frequency carrier, utilized for transmitting a representation of the symbol via the wireless communication medium.

Exemplary modulation types may comprise binary phase shift keying (BPSK), Quadra phase shift keying (QPSK), 16 level QAM (16 QAM), 64 level QAM (64 QAM), and 256 level QAM (256 QAM). For the BPSK modulation type, the number of coded bits associated with a symbol may be represented: $b_{sym}[f_k]=1$ for each frequency carrier $f_k$. For the QPSK modulation type, the number of coded bits associated with a symbol may be represented: $b_{sym}[f_k]=2$, for each frequency carrier $f_k$. For the 16 QAM modulation type, the number of coded bits associated with a symbol may be represented: $b_{sym}[f_k]=4$, for each frequency carrier $f_k$. For the 64 QAM modulation type, the number of coded bits associated with a symbol may be represented: $b_{sym}[f_k]=6$ for each frequency carrier $f_k$. For the 256 QAM modulation type, the number of coded bits associated with a symbol may be represented: $b_{sym}[f_k]=8$, for each frequency carrier $f_k$.

The spatial stream may comprise a plurality of frequency carriers, $N_{SD}$, for example a 20 MHz RF channel may comprise $N_{SD}=56$ frequency carriers, $f_{-28}, f_{-27}, \ldots, f_{-1}, f_1, \ldots, f_{27}$, and $f_{28}$, that may be utilized for transmitting coded bits, while a 40 MHz RF channel may comprise $N_{SD}=112$ frequency carriers, $f_{-56}, f_{-55}, \ldots, f_{-1}, f_1, \ldots, f_{55}$, and $f_{56}$, that may be utilized for transmitting coded bits. In a MIMO system, the symbols sym[$f_{-28}$], sym[$f_{-27}$], . . . , sym[$f_{-1}$], sym[$f_1$], . . . , sym[$f_{27}$], and sym[$f_{28}$], or sym[$f_{-56}$], sym[$f_{-55}$], . . . , sym[$f_{-1}$], sym[$f_1$], . . . , sym[$f_{55}$], and sym[$f_{56}$], may be collectively referred to as an orthogonal frequency division multiplexing (OFDM) symbol. The number of coded bits associated with an OFDM symbol, $N_{CBPS}=N_{SD}*b_{sym}[f_k]$ The number of data bits associated with the OFDM symbol, $N_{DBPS}=R*N_{SD}*b_{sym}[f_k]$, where R may refer to the coding rate.

The constellation mapper block 408n may comprise suitable logic, circuitry, and/or code that may enable a mapping of received bits, associated with a spatial stream, to one or more symbols, substantially as described for the constellation mapper block 408a. In various embodiments of the invention, the number of constellation mapper blocks 408a . . . 408n may be equal to the number of spatial streams, $N_{SS}$, for example.

The beamforming V matrix block 412 may comprise suitable logic, circuitry, and/or code that may enable processing of a received plurality of spatial streams, and generation of a corresponding plurality of signals that may be simultaneously transmitted by a MIMO transmitter 302. A MIMO receiver 322 may receive the information contained in the plurality of spatial streams. Each of the generated corresponding plurality of signals may comprise at least one weighted sum of at least a portion of the received plurality of spatial streams. A weighted sum may be computed corresponding to each of the plurality of frequency carriers, $f_k$. The beamforming V matrix block 412 may generate the corresponding plurality of signals based on a beamforming matrix V.

The IFFT block 410a may comprise suitable logic, circuitry, and/or code that may be utilized to enable conversion of a frequency domain representation of a signal X[f] to a time domain representation X(t). The corresponding time domain signal may comprise a plurality of OFDM symbols. An OFDM symbol may be computed based on application of an IFFT algorithm to the frequency components associated with the corresponding signal X[f]. For example a 64 point IFFT algorithm may be utilized by the IFFT block 410a when processing a 20 MHz RF channel, while a 128 point IFFT algorithm may be utilized when processing a 40 MHz RF channel. An exemplary method for OFDM symbol computation may be found in clause 17.3.5.9 from the IEEE standard 802.11a-1999 (R 2003).

The time domain representation X(t) may comprise time domain representations for a plurality of signals, $x_j(t)$, that may be transmitted simultaneously by a MIMO transmitter 302 as shown in the following equation:

$$X(t) = \begin{bmatrix} x_{N_{TX}}(t) \\ x_{N_{TX}-1}(t) \\ \vdots \\ x_1(t) \end{bmatrix} \quad \text{equation [2]}$$

where $N_{TX}$ may represent the number of transmitting antennas.

Each of the plurality of signals $x_j(t)$ may comprise a plurality of OFDM symbols associated with a $j^{th}$ signal among a plurality of $N_{TX}$ simultaneously transmitted signals from a MIMO transmitter 302. The OFDM symbols may be serially transmitted within the $j^{th}$ signal, $x_j(t)$, among a plurality of $N_{TX}$ simultaneously transmitted signals. Each OFDM symbol may span a time duration, $T_{SYM}$, referred to as a symbol interval, for example $T_{SYM}$=4 μs.

The IFFT block 410n may comprise suitable logic, circuitry, and/or code that may be utilized to enable conversion of a frequency domain representation of a signal X[f] to a time domain representation X(t), substantially as described for the IFFT block 410a. In various embodiments of the invention, the number of IFFT blocks 410a . . . 410n may be equal to the number of generated signals $N_{TX}$, for example.

The insert GI window block 411a may comprise suitable logic, circuitry, and/or code that may be utilized to enable insertion of guard intervals in one of a plurality of signals $x_j(t)$ transmitted by a MIMO transmitter 302. The guard interval, $T_{GI}$, may represent a time interval between the end of a current OFDM symbol interval, and the beginning of a subsequent OFDM symbol interval. Subsequent to the end of a symbol interval associated with a current OFDM symbol there may be a guard interval time duration, $T_{GI}$, for example $T_{GI}$=0.8 μs. Following the guard interval time duration there may be a subsequent symbol interval corresponding to a subsequent OFDM symbol.

The insert GI window block 411n may comprise suitable logic, circuitry, and/or code that may be utilized to enable insertion of guard intervals in one of a plurality of signals $x_j(t)$ transmitted by a MIMO transmitter 302, substantially as described for the insert GI window block 411a. In various embodiments of the invention, the number of insert GI window blocks 411a . . . 411n may be equal to the number of generated signals, $N_{TX}$, for example.

The RFE/ADC block 414a may comprise suitable logic, circuitry, and/or code that may be utilized to enable generation of an analog RF signal from a received generated signal. The received generated signal may comprise I and Q components, for example. The RFE/ADC block 414a may receive a generated baseband signal that comprises a digital representation of information or data. The RFE/ADC block 414a may utilize the information to generate the analog RF signal, which may be characterized by an amplitude, phase, and/or frequency. The RFE/ADC block 414a may generate the analog RF signal by utilizing one or more of a plurality of RF carrier signals to modulate the received baseband signal. The modulated signal may be transmitted via the antenna 415a. The RFE/ADC block 414a may be utilized to enable generation of a 20 MHz RF channel signal, and/or of a 40 MHz RF channel signal, for example.

The RFE/ADC block 414n may comprise suitable logic, circuitry, and/or code that may be utilized to enable generation of an analog RF signal from a received generated signal, substantially as described for the RFE/ADC block 414a. The modulated signal generated by the RFE/ADC block 414n may be transmitted via the antenna 415n. In various embodiments of the invention, the number of RFE/ADC blocks 414a . . . 414n may be equal to the number of generated signals, $N_{TX}$, for example.

The RFE/DAC block 434a may comprise suitable logic, circuitry, and/or code that may be utilized to enable conversion of a received analog RF signal to a baseband signal that comprises a digital representation of the information or data contained in the received analog RF signal. The analog RF signal may be received via the antenna 435a. The received analog RF signal may be characterized by an amplitude, phase, and/or frequency. The digital representation may comprise I and Q components, for example. The RFE/DAC block 434a may utilize one or more RF carrier signals to demodulate the received analog RF signal. The RFE/DAC block 434a may extract the baseband signal by utilizing a low pass filter and/or band pass filter to filter the demodulated signal. The RFE/DAC block 434a may be utilized to enable reception of a 20 MHz RF channel signal, and/or of a 40 MHz RF channel signal, for example.

The RFE/DAC block 434n may comprise suitable logic, circuitry, and/or code that may be utilized to enable conversion of a received analog RF signal to a baseband signal, substantially as described for the RFE/DAC block 434a. The analog RF signal may be received via the antenna 435n. In various embodiments of the invention, for example, the number of RFE/DAC blocks 434a . . . 434n may be equal to the number of received signals, $N_{RX}$.

The remove GI window block 431a may comprise suitable logic, circuitry, and/or code that may be utilized to enable removal of guard intervals from one of a plurality of signals received by a MIMO receiver 322. The guard interval, $T_{GI}$, may be substantially as described for the insert GI window block 411a.

The remove GI window block 431n may comprise suitable logic, circuitry, and/or code that may be utilized to enable removal of guard intervals from one of a plurality of signals received by a MIMO receiver 322, substantially as described for the remove GI window block 431a. In various embodiments of the invention, the number of remove GI window blocks 431a . . . 431n may be equal to the number of received signals, $N_{RX}$, for example.

The FFT block 430a may comprise suitable logic, circuitry, and/or code that may be utilized to enable conversion of a time domain representation of a signal X(t) to a time domain representation X[f]. The signals X(t) and X[f] may be substantially as described for the FFT block 410a. The FFT block 430 may utilize an FFT algorithm to transform a time domain representation of an OFDM symbol into a frequency domain representation comprising a plurality of symbols wherein each symbol is associated with a frequency carrier $f_k$. For example a 64 point FFT algorithm may be utilized by the FFT block 430a when processing a 20 MHz RF channel, while a 128 point FFT algorithm may be utilized when processing a 40 MHz RF channel.

The FFT block 430n may comprise suitable logic, circuitry, and/or code that may be utilized to enable conversion of a time domain representation of a signal X(t) to a time domain representation X[f], substantially as described for the FFT block 430a. In various embodiments of the invention, the number of FFT blocks 430a . . . 430n may be equal to the number of received signals $N_{RX}$, for example.

The channel estimates block 442 may comprise suitable logic, circuitry, and/or code that may enable utilization of preamble information contained with a received signal to compute values associated with a channel estimate matrix H. The preamble may comprise determined information as specified in an applicable IEEE 802.11 standard. The MIMO transmitter 302 may transmit preamble information in each of an ordered plurality of concurrently transmitted signals. Upon receiving the corresponding ordered plurality of concurrently received signals, the MIMO receiver 322 may evaluate values associated with the preamble information, comparing those values with expected values. Based on the comparison, the channel estimates block 442 may compute values for coefficients associated with a channel estimate matrix H.

The beamforming U* matrix block 432 may comprise suitable logic, circuitry, and/or code that may receive a plurality of signals, and enable generation of a plurality of destination streams. Each of the plurality of destination streams generated by the beamforming U* matrix block 432 may be computed based on a weighted sum of at least a portion of the received plurality of signals. The weights utilized for computed the weighted sum may correspond to each of the plurality of frequency carriers, $f_k$, for each of the plurality of destination streams. The beamforming U* matrix block 432 may generate the plurality of destination streams based on a beamforming matrix U*, which comprises the weights.

The constellation demapper block 428a may comprise suitable logic, circuitry, and/or code that may enable a conversion of a received symbol associated with a destination stream, to corresponding bits represented by the received symbol, based on a modulation type. The constellation demapper block 428a may receive a destination symbol d_sym[$f_k$] and determine a corresponding binary representation of bits $c_{\_1\ bsym}[f_k]$, based on a modulation type associated with the destination stream. The representation of the destination symbol, d_sym[$f_k$], may be a complex quantity comprising I and Q components. The frequency carrier, $f_k$, where k may be an index that identifies a frequency associated with a $k^{th}$ frequency carrier, may be one of a plurality of frequency carriers associated with a corresponding RF channel. Exemplary modulation types and correspondence between a destination symbol, d_sym[$f_k$], and corresponding binary representation, $c\_b_{sym}[f_k]$, may be substantially as described for the frequency interleaver block 406a.

The constellation demapper block 428n may comprise suitable logic, circuitry, and/or code that may enable conversion of a received symbol associated with a destination stream, to corresponding bits represented by the received symbol, based on a modulation type, substantially as described for the constellation demapper block 428a. In various embodiments of the invention, the number of constellation demapper blocks 428a . . . 428n may be equal to the number of spatial streams, $N_{SS}$, for example.

The frequency deinterleaver block 426a may comprise suitable logic, circuitry, and/or code that may enable a rearrangement of an order of bits among a block of bits associated with a received destination stream. The frequency deinterleaver block 426a may utilize a plurality of permutations when rearranging the order of bits among a block of bits associated with a received destination stream. The frequency deinterleaver block 426a may receive bits from a plurality of sub-blocks $c\_b_{sub}[f_k]$, rearranging the bits from the various sub-blocks to form a corresponding block of bits associated with the $i^{th}$ destination stream, $c\_b_{st}[i]^{int}$, where the index $f_k$ may represent a frequency carrier. The block of bits $c\_b_{st}[i]^{int}$ may comprise the plurality of bits collectively contained in the corresponding plurality of sub-blocks $c\_b_{sub}[f_k]$ for the range of values for k associated with the corresponding RF channel.

The frequency deinterleaver block 426n may comprise suitable logic, circuitry, and/or code that may enable a rearrangement of an order of bits among a block of bits associated with a received destination stream, substantially as described for the frequency deinterleaver block 426a. In various embodiments of the invention, the number of frequency deinterleaver blocks 426a . . . 426n may be equal to the number of spatial streams, $N_{SS}$, for example.

The spatial interlacer block 425 may comprise suitable logic, circuitry, and/or code that may enable a plurality of parsed blocks of data bits, each of which may be associated with a corresponding plurality of parsed bit streams, to be merged into a single block of data bits associated with a single bit stream. Each of the parsed bit streams may be associated with a destination stream. The spatial interlacer block 425 may receive a plurality of parsed bit streams $c\_b_{st}[i]$, where i may be an index identifying a specific parsed bit stream among the plurality of parsed bit streams. The range of values for the index i may be as described in equation[1]. The plurality of parsed bit streams may be merged to form the corresponding single bit stream $c\_b_{db}$. The single bit stream $c\_b_{db}$ may comprise the plurality of bits collectively contained in the corresponding plurality of parsed bit streams $c\_b_{st}[i]$.

Various embodiments of the invention may not be limited to a specific method for combining bits from a plurality of destination streams to form a single bit stream. For example, given a block of $N_{TOT}$ bits received in a from a single bit stream, the spatial interlacer block 425 may retrieve a block of about $N_{TOT}/N_{SS}$ bits from each of the plurality of $N_{SS}$ destination streams. A first block of $N_{TOT}/N_{SS}$ bits may be retrieved from the parsed bit stream $c\_b_{st}[1]$, a second block of $N_{TOT}/N_{SS}$ bits may be retrieved from the parsed bit stream $c\_b_{st}[2]$, and an $N_{SS}^{th}$ block of $N_{TOT}/N_{SS}$ bits may be retrieved from the parsed bit stream $c\_b_{st}[N_{SS}]$, for example.

The depuncture block 424 may comprise suitable logic, circuitry, and/or code that may enable the insertion of null bits into a received block of data bits. The insertion of null bits may be used to adjust a coding rate associated with coded data contained in the received block of data bits. The adjusted coding rate may represent a determined coding rate, for example, R=½. For example, if the coding rate associated with the received block of data bits is R=¾, the depuncture block 424 may insert 2 null bits into each block of 4 bits from the received block of data bits to produce a depunctured data block comprising 6 bits wherein the coding rate may be R=½.

The decoder block 422 may comprise suitable logic, circuitry, and/or code that may enable the retrieval of an unencoded binary data from an encoded block of binary data. The decoder block 422 may utilize, for example, FEC to detect and/or correct errors in the received encoded block of binary data. The detection and/or correction of error in the received encoded block of binary data may enable a receiver 322 to receive a block of binary data, which corresponds to a block of binary data that was transmitted by a transmitter 302 via a wireless communication medium 342.

Various embodiments of the invention may utilize any of a plurality of FEC methods, for example, decoding based on BCC or LDPC, Turbo decoding, and/or various block decoding techniques such as Reed-Solomon FEC.

The processor 460 may comprise suitable logic, circuitry, and/or code that may enable the computation of values corresponding to beamforming factors based on a frequency carrier, $f_k$. The processor 460 may enable the computation of values corresponding the channel estimate matrix H. The processor 460 may enable the equalizer 432 to select a decomposition method, and/or to perform a selected decomposition method when computing estimated values corresponding to at least a portion of the plurality of destination streams.

The processor 460 may also enable the transmitter 400 to perform transmitter functions in accordance with applicable communications standards. The processor 460 may also enable the receiver 401 to perform receiver functions in accordance with applicable communications standards. These functions may comprise, but are not limited to, tasks performed at lower layers, for example physical layer (PHY) and medium access control (MAC) layer functions, in a relevant protocol reference model. These tasks may comprise physical layer functions, such as physical layer convergence protocol (PLCP), physical medium dependent (PMD), and/or associated layer management functions, for example.

The processor 460 may also enable generation of source information bits and/or retrieval of stored source information bits that may be subsequently, coded, mapped, and transmitted via a wireless medium, for example. The processor 460 may also enable processing of received information bits. The processing information bits may be stored, and subsequently utilized by applications programs executing, at least in part, on the processor 460. The stored and/or processed information may be subsequently coded, mapped, and transmitted via the wireless communications medium, for example.

The memory 462 may comprise suitable logic, circuitry, and/or code that may be utilized to enable storage and/or retrieval of information and/or a representation of the information, for example a binary representation comprising bits. The memory 462 may enable storage of source information bits. The stored source information bits may be assigned physical resources within the memory 462 for the storage. The stored source information bits may be subsequently available for retrieval. Retrieved source information bits may be output by the memory 462 and communicated to other devices, components, and/or subsystems that may be communicatively coupled, directly and/or indirectly, to the memory 462. The memory 462 may enable the stored source information bits to remain stored and/or available for subsequent retrieval until the resources allocated for the storage are deallocated. Physical resources may be deallocated based on a received instruction that the stored source information bits be erased from the memory 462, or based on a received instruction that the physical resources be allocated for the storage of subsequent binary information. The memory 462 may utilize a plurality of storage medium technologies such as volatile memory, for example random access memory (RAM), and/or nonvolatile memory, for example electrically erasable programmable read only memory (EEPROM).

In operation for the transmitter 400, the processor 460 may enable computation of a set of beamforming factors that may be utilized by the beamforming V matrix 412 to concurrently generate a plurality of signals. The beamforming factors may be utilized to generate each of the plurality of signals by combining at least a portion of a plurality of spatial streams. The processor 460 may communicate instructions to the memory 462 causing the memory 462 to retrieve stored information bits. The retrieved information bits may be communicated to the coder block 402. The coder block 402 may utilize BCC to generate coded information bits based on a determined coding rate. The puncture block 404 may receive a block of bits comprising the coded information bits. The puncture block 404 may modify the coding rate utilized for the block of bits, for example, to implement a weaker coding rate. The spatial parser 405 may parse the block of bits to distribute a portion of the block of bits to each of a plurality of $N_{SS}$ spatial streams, for example $N_{SS}=3$ may refer to a plurality of 3 spatial streams.

The frequency interleaver 406a for each of the plurality of spatial streams may rearrange the order of bits in a spatial stream. The rearranged bits may be sorted by frequency carrier, wherein the collective plurality of frequency carriers may be associated with an RF channel utilized for transmitting the information via the wireless communications medium 342. The corresponding constellation mapper 408a may group the sorted bits to form one or more symbols for each of the corresponding frequency carriers. The collective set of concurrently formed symbols, for the plurality of frequency carriers, may be referred to as an OFDM symbol.

The beamforming V matrix block 412 may concurrently generate a plurality of signals by combining symbols associated with at least a portion of the plurality of spatial streams, based on the beamforming factors. Each of the plurality of concurrently generated signals may be a baseband signal. Values associated with the beamforming factors may vary according to spatial stream, generated signal, and/or frequency carrier. The number of concurrently generated signals may correspond to the number of transmitting antennas 415a, . . . , 415n, $N_{TX}$. For example $N_{TX}=3$ may refer to a plurality of 3 concurrently generated signals.

For each of the plurality of concurrently generated signals, an IFFT block 410a may transform a frequency domain representation of the generated signal to a corresponding time domain representation. The corresponding insert GI window block 411 a may insert a time interval between successive OFDM symbols transmitted via the corresponding generated signal. The RFE/DAC block 414a may convert the digital representation for the generated signal to an analog representation. The plurality of RFE/DAC blocks 414a, . . . 414n may modulate a corresponding generated signal in accordance with an RF channel, which may be utilized to transmit the information contained in the plurality of concurrently generated signals via a wireless communication medium.

For the receiver 401, the processor 460 may enable computation of values associated with the channel estimate matrix H that may be utilized by the channel estimates block 442. The values may be utilized by the beamforming U* matrix block 432 to compute estimated values for symbols contained within a plurality of destination streams based on a concurrently received plurality of signals.

The plurality of RFE/ADC blocks 434a, . . . , 434n may concurrently receive a plurality of analog RF signals via the corresponding plurality of receiving antennas 435a, . . . , 435n. The number of concurrently received signals may correspond to the number of receiving antennas 435a, . . . , 435n, $N_{RX}$. For example $N_{RX}=3$ may refer to a plurality of 3 concurrently received signals. Each RFE/ADC block 434a may convert one of the concurrently received analog RF signals to a baseband signal that comprises a digital representation of information contained within the corresponding analog RF signal. The RFE/ADC block 434a may demodulate the RF signal to a baseband signal prior to performing analog to digital conversion of the information. Each baseband signal may comprise a plurality of OFDM symbols wherein each OFDM symbol may be separated by a time interval. The corresponding remove GI window block 431a may remove the time interval, which separates successive OFDM symbols in each received baseband signal.

For each of the received baseband signals, a corresponding FFT block 430a may transform a time domain representation of the OFDM symbol contained within the baseband signal to a frequency domain representation. The frequency domain representation may comprise a plurality of symbols wherein each symbol may be associated with a frequency carriers associated with an RF channel utilized for communicating the received OFDM symbol via the wireless communication channel. Each symbol may comprise at least a portion of the information contained within the OFDM symbol.

The beamforming U* matrix block 432 may utilize the channel estimate matrix H, further performing decomposition on the matrix H, for example, based on a singular value decomposition (SVD) and/or geometric mean decomposition (GMD). The beamforming U* matrix block 432 may utilize a plurality of concurrently received signals, the matrix H, and/or a decomposed version of the matrix H, to compute estimated values for a plurality of destination streams. The number of destination streams at the receiver 401 may correspond to the number of spatial streams at the transmitter 400.

Each of the constellation demapper blocks 428a may receive bits associated with a plurality of symbols associated with an OFDM symbol for a corresponding destination stream. The symbols may be associated with one of a plurality of frequency carriers associated with the RF channel. The constellation demapper block 428a may generate a group of bits corresponding to each symbol. The bits may be sorted in the destination stream in an order according to frequency carrier. A corresponding frequency de-interleaver 426a may rearrange the order of bits in the corresponding destination stream.

The spatial interlacer 425 may merge bits from the plurality of destination streams to form a single bit stream. The spatial interlacer 425 may, for example, select a current block of bits from a current destination stream. The number of bits in the current block may correspond to a number of bits contained in a symbol for the corresponding destination stream. The spatial interlacer 425 may output the selected current block of bits to the single bit stream. The spatial interlacer 425 may select a subsequent block of bits from a subsequent destination stream. The spatial interlacer 425 may output the selected subsequent block of bits to the single bit stream. The order in which bits may be output from the spatial interlacer 425 from various destination streams may be determined based on the order in which corresponding bits were transmitted by the transmitter 400. The order in which the corresponding bits were transmitted by the transmitter 400 may be determined based on the spatial parser 405 and/or the plurality of frequency interleaver blocks 406a, . . . , 406n.

The depuncture block 424 may receive the single bit stream from the spatial interleaver 425. The depuncture block 424 may insert null bits to modify the coding rate associated with the blocks of bits contained within the single bit stream. The decoder block 422 may decode the bits within the single bit stream to extract unencoded information. The decoder block 422 may utilized FEC to detect and/or correct bit errors in the single bit stream. A bit error may be detected when an analysis of the FEC indicates that a detected value for a bit is a different value than is expected. The bit error may be corrected by modifying the detected bit value to correspond to the expected value. The decoder block 422, for example a Viterbi decoder, may utilize soft information to derive statistical estimates for values associated with the unencoded information.

The elements shown in FIG. 4 may comprise components that may be present in an exemplary embodiment of a wireless communications terminal. One exemplary embodiment of a may be a wireless communications transmitter comprising a transmitter 400, a processor 440, and a baseband processor 442. Another exemplary embodiment of a may be a wireless communications receiver comprising a receiver 401, a processor 440, and a baseband processor 442. Another exemplary embodiment of a may be a wireless communications transceiver comprising a transmitter 400, a receiver 401, a processor 440, and a baseband processor 442.

Various embodiments of the invention may enable a reduction in the quantity of feedback information that may be communicated from the receiver 322 to the transmitter 302 via the uplink RF channel. In one aspect of the invention, the computed matrix V may be represented based on a product of Givens matrices:

$$V = G_1(\psi_1) G_2(\psi_2) D_1(\phi_1, \psi_2, \ldots, \psi_N) \quad \text{equation[4]}$$

where $G_j(\psi_j)$ may represent a Givens matrix associated with a rotation angle $\psi_j$, and $D_1(\phi_k)$ may represent a diagonal matrix with phase shift angles $\phi_k$.

The feedback information communicated by the receiver 322 may comprise encoded rotation angles $\psi_j$. The transmitter 302 may utilize the encoded rotation angles to reconstruct the matrix V based on the feedback information.

Various embodiments of the invention comprise a method for reducing the quantity of information, as measured in a number of bits for example, that may be transmitted to describe a downlink RF channel in feedback information when compared to an amount of information that may be transmitted utilizing conventional approaches. The number of bits that may be transmitted in feedback information when utilizing a polar coordinate format may be fewer than a corresponding number of bits that may be transmitted when utilizing a Cartesian coordinate format.

The feedback V matrix may comprise an array of magnitude and corresponding angle component pairs associated with beamforming factors. For example, a 3×3 V matrix comprising 3 rows an 3 columns may be represented as follows:

$$\begin{bmatrix} V_{1,1}(f_k) & V_{1,2}(f_k) & V_{1,3}(f_k) \\ V_{2,1}(f_k) & V_{2,2}(f_k) & V_{2,3}(f_k) \\ V_{3,1}(f_k) & V_{3,2}(f_k) & V_{3,3}(f_k) \end{bmatrix} \quad \text{equation [5]}$$

where $V_{m,n}(f_k)$ may represent a beamforming factor associated with the $k^{th}$ frequency subcarrier transmitted by the $m^{th}$ transmitting antenna and received by an $n^{th}$ receiving antenna, and k=1,2, . . . , $N_{SC}$. The value $N_{SC}$ may represent the number of frequency subcarriers including all data tones and pilot tones associated with an RF channel.

In various embodiments of the invention, a set of frequencies, $f_k$, contained in a tone group may be defined based on a frequency, $f_i$, and tone group size $\epsilon$ according to the following equation:

$$f_i \leq f_k < f_i + \epsilon \Delta_f \quad \text{equation[6]}$$

where $\Delta_f$ may represent a frequency spacing between subcarriers.

An equivalent beamforming V matrix may be constructed based on equation[5] for values of k=1, $\epsilon$+1, 2$\epsilon$+1, ..., $\rho\epsilon$+1, where the value $\rho$ may be about equal to the integer portion of the quotient $(N_{SC}-1)/\epsilon$.

When a WLAN station 104 communicates a feedback V matrix based on an equivalent beamforming matrix V for a downlink RF channel to a WLAN station 106 via a corresponding uplink RF channel, the WLAN station 106 may compute a full beamforming matrix V corresponding to the equivalent beamforming V matrix but utilizing an interpolation method. When the feedback V matrix comprises a beamforming factor $V(f_1)$, where $f_1$ is a frequency in a tone group comprising $f_1, f_2, \ldots f_{\epsilon-1}$ for example, the WLAN station 106 may utilize an interpolation method to estimate values for the beamforming factors $V(f_2)$, $V(f_3)$, ..., $V(f_{\epsilon-1})$ based on the received beamforming factor $V(f_1)$. Similarly, when the feedback V matrix comprises a beamforming factor $V(f_k)$, where $f_k$ is a frequency in a tone group comprising $f_1, f_2, \ldots f_{\epsilon-1}$ for example, the WLAN station 106 may utilize an interpolation method to estimate values for the beamforming factors $V(f_1)$, $V(f_2)$, ..., $V(f_{k-1})$, $V(f_{k+1})$, ..., $V(f_{\epsilon-1})$ based on the received beamforming factor $V(f_k)$. An interpolation method that may be utilized by the WLAN station 106 may comprise, but not be limited to, low pass interpolation, linear interpolation, or cubic interpolation, for example.

In one aspect related to the matrix V, a matrix multiplication of V and V* may produce an identity I matrix. The matrix V* may represent a Hermitian transpose of the matrix V. A Hermitian transpose of a matrix may be represented by constructing a transpose of the matrix followed by constructing a complex conjugate version of each element in the transposed matrix. An identity matrix may be characterized by an array for which diagonal elements contain a value equal to 1 and non-diagonal elements contain a value equal to 0. An identity matrix may be represented as a square matrix in that the number of rows in the matrix may be equal to the number of columns. When the conditions VV*=1 and V*V=1 are true, the matrix V may be referred to as a unitary matrix. The unitary matrix V may contain redundant information. Consequently, the number of degrees of freedom of the matrix V may be less than N×N. This may imply that it may be possible to reduce the number of parameters based on the number of degrees of freedom of the matrix V, for example, using angles.

When the V matrix contains redundant information, at least a portion of the angle components contained in the matrix may be redundant. In this case, the number of bits that may be transmitted as feedback information in a redundancy reduced V matrix may be reduced when compared to conventional approaches that may not utilize redundant information. Various embodiments of the invention may comprise a method and system for reducing the number of bits that may be transmitted in feedback information. The method and system may utilize Givens rotation.

An N×M matrix comprising matrix elements arranged in N rows and M columns may represent a N-dimensional vector space. For a given matrix element for which a corresponding value is not equal to 0, a Givens rotation may be utilized to rotate the N-dimensional vector space such that the value of the corresponding matrix element in the rotated vector space is about equal to 0. The Givens rotation may be represented as an N×N Givens rotation matrix, $G_{li}(\psi)$, in the following expression:

$$G_{li}(\psi_{li}) = \begin{bmatrix} I_{l-1} & 0 & 0 & 0 & 0 \\ 0 & \cos(\psi_{li}) & 0 & \sin(\psi_{li}) & 0 \\ 0 & 0 & I_{i-l-1} & 0 & 0 \\ 0 & -\sin(\psi_{li}) & 0 & \cos(\psi_{li}) & 0 \\ 0 & 0 & 0 & 0 & I_{N-i} \end{bmatrix} \quad \text{equation [7]}$$

where l may indicate a row in a matrix, i may indicate a column, $I_n$ may represent an identity matrix comprising n rows and n columns, and $\psi_{li}$ may represent a rotation angle. The value of the element located at the $l^{th}$ row and $l^{th}$ column in the matrix of equation[7] may be about equal to the value of the expression $\cos(\psi_{li})$. The value of the element located at the $i^{th}$ row and $i^{th}$ column may be about equal to the value of the expression $\cos(\psi_{li})$. The value of the element located at the $l^{th}$ row and $i^{th}$ column may be about equal to the value of the expression $-\sin(\psi_{li})$. The value of the element located at the $i^{th}$ row and $l^{th}$ column may be about equal to the value of the expression $\sin(\psi_{li})$. Each "0" indicated in the matrix of equation[7] may represent one or more matrix elements for which each corresponding value is about 0. For example, the first row of 0's in the matrix may represent a block of elements comprising l-1 rows and N-(l-1) columns for which the value of each element is about 0. A block of elements comprising 0 rows and/or 0 columns may be omitted from the matrix of equation[7].

A Givens rotation matrix may generally be utilized to rotate elements in a matrix for which the associated values are represented by real numbers. The beamforming matrix, V, may generally comprise elements for which the associated values are represented by complex numbers. The matrix V may be multiplied by an M×M column-wise phase shift matrix, $\tilde{D}$, which may be represented as follows:

$$\tilde{D} = \begin{bmatrix} e^{j\theta_1} & 0 & \cdots & 0 \\ 0 & e^{j\theta_2} & 0 & \vdots \\ \vdots & 0 & \ddots & 0 \\ 0 & \cdots & 0 & e^{j\theta_M} \end{bmatrix} \quad \text{equation [8]}$$

where $\theta_i$ may represent a phase shift associated with column i, e may represent a value about equal to 2.718, and j may represent the complex value equal to the square root of −1.

The matrix $\tilde{V} = V\tilde{D}$ may represent a column-wise phase shifted version of the matrix V. The corresponding values of elements located at the $i^{th}$ row and $i^{th}$ column of the matrix $\tilde{V}$, multiplied by series of $G_{li}$ and $D_i$, may be represented by real numbers. The unitary matrix V may be column-wise phase invariant. For a column-wise phase invariant matrix, the matrix V may be considered to be equivalent to the matrix $\tilde{V}$.

The matrix V may be multiplied by an N×N second phase shift matrix, $D_i$, which may be represented as follows:

$$D_i = \begin{bmatrix} I_i & 0 & \cdots & 0 \\ 0 & e^{j\varphi_{i+1,i}} & 0 & \vdots \\ \vdots & 0 & \ddots & 0 \\ 0 & \cdots & 0 & e^{j\varphi_{N,i}} \end{bmatrix} \quad \text{equation [9]}$$

where $\phi_{a,b}$ may represent a phase shift associated with a matrix element located at row a and column b in $\tilde{V}$.

The result of the matrix multiplication $D_i^* V\tilde{D}$ may represent a phase shifted version of the matrix V, where $D_i^*$ may represent a Hermitian transpose of the phase shift matrix $D_i$. The corresponding values of elements located at the $i^{th}$ column of the product matrix $D_i^* V\tilde{D}$ may be represented by real numbers.

The matrix product $G_{Ii}(\psi_{Ii}) D_i^* V\tilde{D}$ may represent a Givens rotated version of the matrix $D_i^* V\tilde{D}$. An N-dimensional vector space represented by the matrix product $G_{Ii}(\psi_{Ii}) D_i^* V\tilde{D}$ may equivalent to a $\psi_{Ii}$ degree angular rotation applied to the N-dimensional vector space represented by the matrix $D_i^* V\tilde{D}$. If a nonzero value is associated with an element located in the $I^{th}$ row and $i^{th}$ column of the matrix $D_i^* V\tilde{D}$, represented as the (I,i) element, the corresponding value of the (I,i) element of the matrix product $G_{Ii}(\psi_{Ii}) D_i^* V\tilde{D}$ may be about equal to 0.

One characteristic of Givens rotations is that rotations may be applied iteratively to select matrix elements for which corresponding values are to be set to about 0 as a result of successive rotations. For example, based on a current Givens rotation matrix, $G_{Ii}(\psi_{Ii})$, and a subsequent Givens matrix $G_{ki}(\psi_{ki})$, a subsequent matrix product $G_{Ii}(\psi_{Ii}) G_{ki}(\psi_{ki}) D_i^* V\tilde{D}$ may be computed. The value of the (I,i) element of the subsequent matrix product may be equal to about 0. The value of the (k,i) element of the subsequent matrix product may also be about equal to 0.

In various embodiments of the invention, the process may be repeated until a subsequent rotated matrix is computed such that the value associated with each element I in column i is about equal to 0. The range of values for the row indicator I may be subject to the following condition:

$$N \geq 1 > i \qquad \text{equation[10]}$$

where N may represent the number of rows in the matrix V.

After repeating the process for each element I in column i=1, for example, a subsequent rotated matrix may be represented as follows:

$$G_{21}(\psi_{21}) G_{31}(\psi_{31}) \ldots G_{N1}(\psi_{N1}) D_1^* V\tilde{D} = \begin{bmatrix} 1 & 0 & \ldots & 0 \\ 0 & & & \\ \vdots & & V_2 & \\ 0 & & & \end{bmatrix} \qquad \text{equation [11]}$$

where $V_2$ may represent an $(N-1)\times(M-1)$ submatrix.

For an $i^{th}$ column, equation[11] may be generalized and represented as follows:

$$G_{i+1,i}(\psi_{21}) G_{i+2,i}(\psi_{31}) \ldots G_{N,1}(\psi_{N1}) D_i^* R_i = \begin{bmatrix} I_i & 0 & \ldots & 0 \\ 0 & & & \\ \vdots & & V_{i+1} & \\ 0 & & & \end{bmatrix} \qquad \text{equation [12]}$$

where $R_i$ may represent a previous rotated matrix, and $V_{i+1}$ may represent an $(N-i)\times(M-i)$ submatrix. The phase shift angle $\theta_{i+1}$ in equation[8] may be defined such that the (1,1) element in the matrix $V_{i+1}$ may be represented by real numbers.

In various embodiments of the invention, the process shown in equation[12] may be repeated for a subsequent column wherein the range of values for the column indicator i may be subject to the following condition:

$$\min(M, N-1) \geq i \geq 1 \qquad \text{equation[13]}$$

where N may represent the number of rows in the matrix V, M may represent the number of columns in the matrix V, and min(a,b) may represent an expression, the value of which may be the minimum value among arguments a and b.

Based on equations [7], [9], [12], [13], and the unitary matrix property, the matrix V may be expressed based the Givens rotations according to the following equation:

$$V = \prod_{i=1}^{\min(M,N-1)} \left[ D_i \prod_{l=i+1}^{N} G_{li}^*(\psi_{li}) \right] \times \tilde{I} \qquad \text{equation [14]}$$

where $\tilde{I}$ may represent an N×M matrix comprising an identity matrix $I_{\min(N,M)}$ and either a block of max(0,N−M) rows of elements, or a block of max(0,M−N) columns of elements, with each element of a value about 0, max(a,b) may represent an expression, the value of which may be the maximum value among arguments a and b, and the operator $\Pi[X_i]$ may represent a right-side matrix multiplication product among a set of matrices $X_i$. $G_{Ii}(\psi_{Ii})^*$ may represent a Hermitian transpose of the Givens rotation matrix $G_{Ii}(\psi_{Ii})$. The Givens rotation matrix $G_{Ii}(\psi_{Ii})$ is as defined in equation[7] and the phase shift matrix $D_i$ is as defined in equation[9].

In various embodiments of the invention, feedback information may comprise values for one or more rotation angle parameters comprising one or more phase shift angles $\phi_{Ii}$ and one or more Givens rotation angles $\psi_{Ii}$. The following table represents the number of parameters that may be utilized in feedback information to represent an N×M beamforming matrix V, for exemplary values of N rows and M columns:

TABLE 1

| Angles to be reported in feedback information | | |
| --- | --- | --- |
| Dimensions (N × M) | Number of Parameters | Feedback Angle Parameters |
| 2 × 1 | 2 | $\phi_{21}, \psi_{21}$ |
| 2 × 2 | 2 | $\phi_{21}, \psi_{21}$ |
| 3 × 1 | 4 | $\phi_{21}, \phi_{31}, \psi_{21}, \psi_{31}$ |
| 3 × 2 | 6 | $\phi_{21}, \phi_{31}, \psi_{21}, \psi_{31}, \phi_{32}, \psi_{32}$ |
| 3 × 3 | 6 | $\phi_{21}, \phi_{31}, \psi_{21}, \psi_{31}, \phi_{32}, \psi_{32}$ |
| 4 × 1 | 6 | $\phi_{21}, \phi_{31}, \phi_{41}, \psi_{21}, \psi_{31}, \psi_{41}$ |
| 4 × 2 | 10 | $\phi_{21}, \phi_{31}, \phi_{41}, \psi_{21}, \psi_{31}, \psi_{41}, \phi_{32}, \phi_{42}, \psi_{32}, \psi_{42}$ |
| 4 × 3 | 12 | $\phi_{21}, \phi_{31}, \phi_{41}, \psi_{21}, \psi_{31}, \psi_{41}, \phi_{32}, \phi_{42}, \psi_{32}, \psi_{42}, \phi_{43}, \psi_{43}$ |
| 4 × 4 | 12 | $\phi_{21}, \phi_{31}, \phi_{41}, \psi_{21}, \psi_{31}, \psi_{41}, \phi_{32}, \phi_{42}, \psi_{32}, \psi_{42}, \phi_{43}, \psi_{43}$ |

The feedback angles represented in Table 1 may be reported for each of the $N_{SC}$ plurality of frequency subcarriers associated with the corresponding downlink RF channel. The order of angles represented in Table 1 may be determined based on the order of multiplications that may be performed when reconstructing the V matrix for each subcarrier at the WLAN 106 that receives the feedback information. For example, for given feedback angles, $\phi_{Ii}$ and $\psi_{Ii}$, the angles may be represented as a vectors of angles, $\phi_{Ii}[-N_{SC}2, -N_{SC}2+1, \ldots, -2, -1, 1, 2, \ldots, N_{SC}2-1, N_{SC}/2]$ and $\psi_{Ii}[-N_{SC}2, N_{SC}2+1, \ldots, -2, -1, 1, 2, \ldots, N_{SC}/2-1, N_{SC}/2]$, where $N_{SC}$ may represent the number of subcarriers associated with the downlink RF channel.

When tone grouping is utilized, in accordance with various embodiments of the invention, the feedback angles represented in Table 1 may be reported for a portion of the $N_{SC}$ plurality of frequency subcarriers associated with the corresponding downlink RF channel. For example, for a tone group size represented by $\epsilon$, the feedback angles, $\phi_{li}$ and $\psi_{li}$ may be represented as a vectors of angles, $\phi_{li}[-N_{SC}/2, -N_{SC}/2+\epsilon, -N_{SC}/2+2\epsilon, \ldots, -N_{SC}/2+\kappa\epsilon]$ and $\psi_{li}[-N_{SC}/2, -N_{SC}/2+\epsilon, -N_{SC}/2+2\epsilon, \ldots, -N_{SC}/2+\kappa\epsilon]$, where $\kappa$ may represent an integer, the value of which may be within a range according to the condition $0 \leq \kappa \leq N_{SC}\epsilon$.

The feedback angles $\phi_{li}$ and $\psi_{li}$ may also be represented as a vectors of angles, $\phi_{li}[-N_{SC}/2, -N_{SC}/2+\epsilon, -N_{SC}/2+2\epsilon, \ldots, -1, 1, 1+\epsilon, 1+2\epsilon, \ldots, N_{SC}/2]$ and $\psi_{li}[-N_{SC}/2, -N_{SC}/2+\epsilon, -N_{SC}/2+2\epsilon, \ldots, -1, 1, 1+\epsilon, 1+2\epsilon, \ldots, N_{SC}/2]$. In another embodiment of the invention the feedback angles $\phi_{li}$ and $\psi_{li}$ may also be represented as a vectors of angles, $\phi_{li}[-N_{SC}/2, -N_{SC}/2+\epsilon, -N_{SC}/2+2\epsilon, \ldots, -N_{SC}/2+n\epsilon, -1, 1, N_{SC}/2-n\epsilon, \ldots, N_{SC}/2-\epsilon, N_{SC}/2]$ and $\psi_{li}[-N_{SC}/2, -N_{SC}/2+\epsilon, -N_{SC}/2+2\epsilon, \ldots, -N_{SC}/2+n\epsilon, -1, 1, N_{SC}/2-n\epsilon, \ldots, N_{SC}/2-\epsilon, N_{SC}/2]$, where n may represent an integer, the value of which may be within a range according to the condition $-N_{SC}/2+n\epsilon \leq -1$.

When a WLAN station 104 communicates feedback information based tone grouping, the WLAN station 106 may receive a feedback beamforming V matrix comprising a plurality feedback angles $\phi_{li}[-N_{SC}/2, -N_{SC}/2+\epsilon, -N_{SC}/2+2\epsilon, \ldots, -N_{SC}/2+\kappa\epsilon]$ and $\psi_{li}[-N_{SC}/2, -N_{SC}/2+\epsilon, -N_{SC}/2+2\epsilon, \ldots, -N_{SC}/2+\kappa\epsilon]$ according to Table 1. The WLAN station 106 may utilize an interpolation method to compute a corresponding plurality of feedback angles $\phi_{li}[-N_{SC}/2, -N_{SC}/2+1, \ldots, -2, -1, 1, 2, \ldots, N_{SC}/2-1, N_{SC}/2]$ and $\psi_{li}[-N_{SC}/2, -N_{SC}/2+1, \ldots, -2, -1, 1, 2, \ldots, N_{SC}/2-1, N_{SC}/2]$. The WLAN station 106 may subsequently compute values $V(f_k)$ based on corresponding values $\phi_{li}[k]$ and $\psi_{li}[k]$.

The order in which feedback angles $\phi_{li}$ and $\psi_{li}$ may be reported as shown in Table 1 is exemplary, the feedback angles may be reported using other orderings. In another embodiment of the invention, for example, given a 4×2 beamforming matrix V, the order in which feedback angles may be reported may be represented $\phi_{21}, \psi_{21}, \phi_{31}, \psi_{31}, \phi_{41}, \psi_{41}, \phi_{32}, \psi_{32}, \phi_{42}, \psi_{42}$, and $\phi_{43}, \psi_{43}$.

In various embodiments of the invention, actual values for angles reported in feedback information may be determined based on a codebook. In an exemplary embodiment of the invention, a range of true values for Givens rotation angles may comprise $0 \leq \psi_{li} \leq \pi/2$. A range of true values for phase rotation angles may comprise $0 \leq \phi_{li} \leq 2\pi$, for example. Values for the Givens rotation angles may be approximated based on a binary encoding comprising a plurality of $b_{104}$ bits. Values for Givens rotation angles that are represented by a binary encoding of bits may be referred to as quantized values. The range of values for binary quantized values for the Givens rotation angles may comprise $k\pi/2^{b_\psi+1}+\pi/2^{b_\psi+2}$, where k may be equal to one of a range of values comprising $0, 1, \ldots, 2^{b_\psi}-1$, for example. Values for the phase rotation angles may be approximated based on a binary encoding comprising a plurality of $b_\phi$ bits. The range of values for binary quantized values for the phase rotation angles may comprise $k\pi/2^{b_\phi-1}+\pi/2^{b_\phi}$, where k may be equal to one of a range of values comprising $0, 1, \ldots, 2^{b_\phi}-1$, for example. Differences in value between a true value and a corresponding quantized value may be referred to as a quantization error. The potential size of a given quantization error may be based on the number of bits utilized during binary encoding.

In another embodiment of the invention, a range of true values for Givens rotation angles may comprise $0 \leq \psi_{li} \leq \pi$. A range of true values for phase rotation angles may comprise $0 \leq \phi_{li} \leq \pi$, for example. The range of values for binary quantized values for the Givens rotation angles may comprise $k\pi/b \cdot 2^{b_\psi}+\pi/2^{b_\psi+1}$, for example. The range of values for binary quantized values for the phase rotation angles may comprise $k\pi/2^{b_\phi}+\pi/2^{b_\phi+1}$, for example.

The number of bits utilized during binary encoding of $\psi_{li}$ and during binary encoding of $\phi_{li}$ respectively may be represented as a $(b_\psi, b_\phi)$ tuple. A tuple utilized in an exemplary codebook may comprise (1,3) to represent the combination $b_\psi=1$ and $b_\phi=3$. Other tuples in the exemplary codebook may comprise (2,4), (3,5), or (4,6).

Various embodiments of the invention may comprise a method and a system for utilizing Givens rotations for representing beamforming matrices in feedback information. In one aspect of the invention, the number of bits contained in the feedback information may be reduced in comparison to a corresponding number of bits contained in feedback information based on a Cartesian coordinate format representation. The number of bits contained in feedback information, which is generated in accordance with an embodiment of the invention may be determined based on the size of the V matrix, as measured by N rows and M columns, the number of frequency carriers in a tone group, the tone group size, the number of subcarriers associated with the corresponding downlink RF channel, and the number of bits utilized during binary encoding of the Givens rotation angles, and phase rotation angles.

Table 2A presents an exemplary mapping between bits contained in feedback information, and the corresponding angle that may be reported. In the exemplary mapping of Table 2A, the reported angles may be grouped by frequency carrier. In Table 2A, N=4, M=2, the downlink channel may be a 40 MHz RF channel, and the bits utilized may be represented by the tuple (2,4). The tone grouping size may be represented by $\epsilon=4$. The range $b_j \ldots b_k$ may represent a range of bit positions in the feedback information where in $b_j$ may represent the least significant bit (LSB) in the range and $b_k$ may represent the most significant bit (MSB) in the range, for example. The notation $f_p$ may represent a frequency subcarrier associated with the RF channel. Values for the index p may represent a range of integer values where the value $N_{SC}=112$, for example. The notation $\psi_{li}(f_p)$ may refer to a Givens rotation angle associated with frequency subcarrier $f_p$. The notation $\phi_{li}(f_p)$ may refer to a phase rotation angle associated with frequency subcarrier $f_p$.

TABLE 2A

Exemplary encoding of feedback information for a 40 MHz RF Channel with Tone Grouping Size 4

| Feedback Bits | Angle Reported |
|---|---|
| $b_1 \ldots b_4$ | $\phi_{21}(f_{-56})$ |
| $b_5 \ldots b_8$ | $\phi_{31}(f_{-56})$ |
| $b_9 \ldots b_{12}$ | $\phi_{41}(f_{-56})$ |
| $b_{13} \ldots b_{14}$ | $\psi_{21}(f_{-56})$ |
| $b_{15} \ldots b_{16}$ | $\psi_{31}(f_{-56})$ |
| $b_{17} \ldots b_{18}$ | $\psi_{41}(f_{-56})$ |
| $b_{19} \ldots b_{22}$ | $\phi_{32}(f_{-56})$ |
| $b_{23} \ldots b_{26}$ | $\phi_{42}(f_{-56})$ |
| $b_{27} \ldots b_{28}$ | $\psi_{32}(f_{-56})$ |
| $b_{29} \ldots b_{30}$ | $\psi_{42}(f_{-56})$ |
| $b_{31} \ldots b_{34}$ | $\phi_{21}(f_{-52})$ |
| $b_{35} \ldots b_{38}$ | $\phi_{31}(f_{-52})$ |
| $b_{39} \ldots b_{42}$ | $\phi_{41}(f_{-52})$ |
| $b_{33} \ldots b_{44}$ | $\psi_{21}(f_{-52})$ |
| $b_{15} \ldots b_{16}$ | $\psi_{31}(f_{-56})$ |
| $b_{47} \ldots b_{48}$ | $\psi_{41}(f_{-52})$ |
| $b_{49} \ldots b_{52}$ | $\phi_{32}(f_{-52})$ |

TABLE 2A-continued

Exemplary encoding of feedback information for a 40 MHz
RF Channel with Tone Grouping Size 4

| Feedback Bits | Angle Reported |
|---|---|
| $b_{53} \ldots b_{56}$ | $\phi_{42}(f_{-52})$ |
| $b_{57} \ldots b_{58}$ | $\psi_{32}(f_{-52})$ |
| $b_{59} \ldots b_{60}$ | $\psi_{42}(f_{-52})$ |
| ... | ... |
| $b_{811} \ldots b_{814}$ | $\phi_{21}(f_{56})$ |
| $b_{815} \ldots b_{818}$ | $\phi_{31}(f_{56})$ |
| $b_{819} \ldots b_{822}$ | $\phi_{41}(f_{56})$ |
| $b_{823} \ldots b_{824}$ | $\psi_{21}(f_{56})$ |
| $b_{825} \ldots b_{826}$ | $\psi_{31}(f_{56})$ |
| $b_{827} \ldots b_{828}$ | $\psi_{41}(f_{56})$ |
| $b_{829} \ldots b_{832}$ | $\phi_{32}(f_{56})$ |
| $b_{833} \ldots b_{836}$ | $\phi_{42}(f_{56})$ |
| $b_{837} \ldots b_{838}$ | $\psi_{32}(f_{56})$ |
| $b_{839} \ldots b_{840}$ | $\psi_{42}(f_{56})$ |

The exemplary feedback information shown in Table 2A comprises 840 bits: 280 bits may be utilized to communicate Givens rotation angles, and 560 bits may be utilized to communicate phase rotation angles.

Table 2B presents an exemplary mapping between bits contained in feedback information, in which tone grouping may not be utilized. In the exemplary mapping of Table 2B, the reported angles may also be grouped by frequency carrier. In Table 2B, N=2, M=2, the downlink channel may be a 20 MHz RF channel, and the bits utilized may be represented by the tuple (3,5). The range $b_j \ldots b_k$ may represent a range of bit positions in the feedback information where in $b_j$ may represent the least significant bit (LSB) in the range and $b_k$ may represent the most significant bit (MSB) in the range, for example. The notation $f_p$ may represent a frequency subcarrier associated with the RF channel. Values for the index p may represent a range of integer values where the value may be $N_{SC}=56$, for example.

TABLE 2B

Exemplary encoding of feedback information for 20 MHz
RF Channel without Tone Grouping

| Feedback Bits | Angle Reported |
|---|---|
| $b_1 \ldots b_5$ | $\phi_{21}(f_{-28})$ |
| $b_6 \ldots b_8$ | $\psi_{21}(f_{-28})$ |
| $b_9 \ldots b_{13}$ | $\phi_{21}(f_{-27})$ |
| $b_{14} \ldots b_{16}$ | $\psi_{21}(f_{-27})$ |
| ... | ... |
| $b_{441} \ldots b_{445}$ | $\phi_{21}(f_{28})$ |
| $b_{446} \ldots b_{448}$ | $\psi_{21}(f_{28})$ |

The exemplary feedback information shown in Table 2B comprises 840 bits: 168 bits may be utilized to communicate Givens rotation angles, and 280 bits may be utilized to communicate phase rotation angles.

While the exemplary feedback information in Tables 2A and 2B show Givens rotation and phase shift angles grouped by frequency carrier, where the frequency carriers are sorted in increasing monotonic order from lowest frequency $f_{-NSC}$ to highest frequency $f_{NSC}$, various embodiments of the invention may not be so limited. For example, the frequency carriers may be arranged in a plurality of orderings. For example, the frequency carriers may be sorted in decreasing monotonic order from highest frequency to lowest frequency. Frequency carriers may be sorted such that odd index-numbered frequency carriers are reported first followed by even-numbered frequency carriers, for example. Frequency carriers may be sorted in accordance with specifications contained within a standards document, for example, an IEEE 802.11 specification.

The number of bytes contained in various exemplary feedback information when utilizing various embodiments of the invention in comparison to the number of bytes contained in corresponding feedback information when utilizing a Cartesian format representation is disclosed in U.S. patent application Ser. No. 11/327,752 filed Jan. 6, 2006, which is hereby incorporation herein in its entirety.

Figure 5:
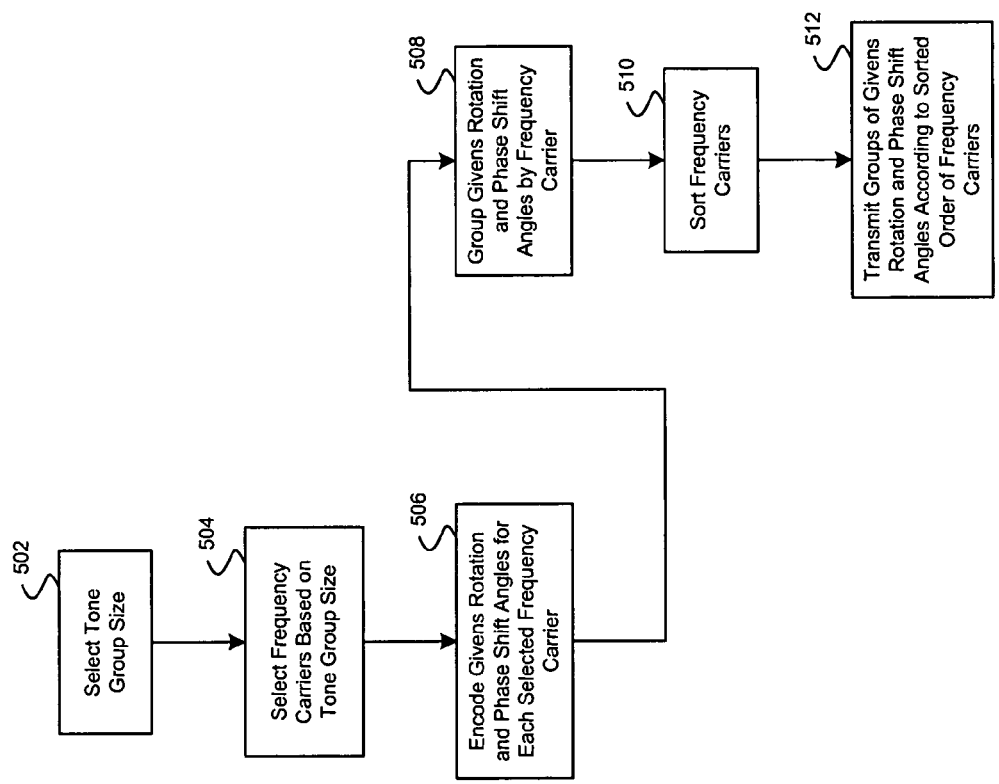
FIG. 5 is a flowchart illustrating exemplary steps for utilizing Givens rotations and tone grouping for beamforming matrices in feedback information, in accordance with an embodiment of the invention.

FIG. 5 is a flowchart illustrating exemplary steps for utilizing Givens rotations and tone grouping for beamforming matrices in feedback information, in accordance with an embodiment of the invention. Referring to FIG. 5, in step 502, a tone group size may be selected. In step 504, a set of frequency carriers may be selected based on the tone group size. The number of frequency carriers selected may be less than or equal to $N_{SC}$. In step 506, information related to Givens rotation angles and/or phase shift angles may be encoded for each selected frequency carrier. One or more Givens rotation angles and/or phase shift angles for each selected frequency carrier. In step 508, the encoded Givens rotation angles and/or phase shift angles may be grouped by frequency carrier. In this arrangement, a set of one or more encoded Givens rotation angles and/or phase shift angles may be grouped where each member of the group is associated with a frequency carrier, $f_k$. In step 510, the frequency carriers may be sorted. Correspondingly, the groups of encoded Givens rotation angles and/or phase shift angles may be sorted. In step 512, the sorted groups of Givens rotation angles and/or phase shift angles may be transmitted according to the sorted order of frequency carriers.

Aspects of a system for utilizing Givens rotation to reduce feedback information overhead may comprise a processor 460 and/or receiver 401 that may enable computation of a beamforming matrix for signals received from a transmitter 400 in a multiple input multiple output (MIMO) communication system. The processor 460 and/or receiver 401 may enable computation of Givens rotation angles and/or phase rotation angles based on the computed beamforming matrix. The receiver 401 may also enable feedback of information containing the Givens rotation angles and/or phase rotation angles to the transmitter 400.

The processor 460 and/or receiver 401 may enable computation of the Givens rotation and/or phase rotation angles for at least a portion of a plurality of frequency carriers associated with a corresponding RF channel. The number of frequency carriers in the portion, or more, may be determined based on a selected tone group size. The processor 460 and/or receiver 401 may enable grouping of the Givens rotation and/or phase rotation angles by each frequency carrier in the portion, or more, of the plurality of frequency carriers.

The receiver 401 may enable communication of a current group of the Givens rotation angles and/or phase rotation angles in the feedback information, followed by communication of one or more subsequent groups of the Givens rotation angles and/or phase rotation angles. The current group may be associated with a current frequency carrier in the portion, or more, of the plurality of frequency carriers. The one or more subsequent groups may be associated with a corresponding one or more subsequent frequency carriers in the portion, or more, of the plurality of frequency carriers. The current frequency carrier and each of the one or more subsequent frequency carriers may be unique.

The processor 460 and/or receiver 401 may enable sorting of the portion, or more, of the plurality of frequency carriers in a determined order. The receiver 401 may enable communication of a first group of the Givens rotation angles and/or phase rotation angles in the feedback information, followed by communication of one or more subsequent groups of the Givens rotation angles and/or phase rotation angles, in an order according to the determined order. The determined order may be in order of increasing frequency, or in order of decreasing frequency, in the portion, or more, of the plurality of frequency carriers. The determined order may also be as specified in an IEEE 802.11 specification document. Specification documents may comprise standards documents, and draft specification documents, for example.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
    computing a beamforming matrix for signals received from a transmitter in a MIMO communication system;
    computing, based on said computed beamforming matrix, one or more Givens rotation angles associated with one or more Givens matrices and a corresponding one or more phase rotation angles associated with a phase shifting matrix that is separate from said one or more Givens matrices; and
    communicating feedback information to said transmitter, said feedback information comprising said one or more Givens rotation angles and said corresponding one or more phase rotation angles.

2. The method according to claim 1, comprising computing said one or more Givens rotation angles and said corresponding one or more phase rotation angles for at least a portion of a plurality of frequency carriers associated with a corresponding RF channel.

3. The method according to claim 2, comprising grouping said one or more Givens rotation angles and said corresponding one or more phase rotation angles by each frequency carrier in said at least a portion of said plurality of frequency carriers.

4. The method according to claim 3, comprising communicating a current group of said one or more Givens rotation angles and said corresponding one or more phase rotation angles via said feedback information, followed by at least one subsequent group of said one or more Givens rotation angles and said corresponding one or more phase rotation angles.

5. The method according to claim 4, wherein said current group is associated with a current frequency carrier in said at least a portion of said plurality of frequency carriers, and said at least one subsequent group is associated with a corresponding at least one subsequent frequency carrier in said at least a portion of said plurality of frequency carriers.

6. The method according to claim 5, wherein said current frequency carrier, and each of said at least one subsequent frequency carrier is unique.

7. The method according to claim 3, comprising sorting said at least a portion of said plurality of frequency carriers in a determined order.

8. The method according to claim 7, comprising communicating a first group of said one or more Givens rotation angles and said corresponding one or more phase rotation angles via said feedback information, and at least one subsequent group of said one or more Givens rotation angles and said corresponding one or more phase rotation angles in an order according to said determined order.

9. The method according to claim 7, wherein said determined order is one of: in order of increasing frequency and in order of decreasing frequency, in said at least a portion of said plurality of frequency carriers.

10. The method according to claim 7, wherein said sorting is implemented in a Wireless Local Access Network.

11. A system for processing signals in a communication system, the system comprising:
    one or more circuits that are operable to compute a beamforming matrix for a signals received from a transmitter in a MIMO communication system;
    said one or more circuits are operable to compute, based on said computed beamforming matrix, one or more Givens rotation angles associated with one or more Givens matrices and a corresponding one or more phase rotation angles associated with a phase shifting matrix that is separate from said one or more Givens matrices; and
    said one or more circuits are operable to communicate feedback information to said transmitter, said feedback information comprising said one or more Givens rotation angles and said corresponding one or more phase rotation angles.

12. The system according to claim 11, wherein said one or more circuits are operable to compute said one or more Givens rotation angles and said corresponding one or more phase rotation angles for at least a portion of a plurality of frequency carriers associated with a corresponding RF channel.

13. The system according to claim 12, wherein said one or more circuits are operable to group said one or more Givens rotation angles and said corresponding one or more phase rotation angles by each frequency carrier in said at least a portion of said plurality of frequency carriers.

14. The system according to claim 13, wherein said one or more circuits are operable to communicate a current group of said one or more Givens rotation angles and said corresponding one or more phase rotation angles via said feedback information, followed by at least one subsequent group of said one or more Givens rotation angles and said corresponding one or more phase rotation angles.

15. The system according to claim 14, wherein said current group is associated with a current frequency carrier in said at least a portion of said plurality of frequency carriers, and said at least one subsequent group is associated with a corresponding at least one subsequent frequency carrier in said at least a portion of said plurality of frequency carriers.

16. The system according to claim 15, wherein said current frequency carrier, and each of said at least one subsequent frequency carrier is unique.

17. The system according to claim 13, wherein said one or more circuits are operable to sort said at least a portion of said plurality of frequency carriers in a determined order.

18. The system according to claim 17, wherein said one or more circuits are operable to communicate a first group of said one or more Givens rotation angles and said corresponding one or more phase rotation angles via said feedback information, and at least one subsequent group of said one or more Givens rotation angles and said corresponding one or more phase rotation angles in an order according to said determined order.

19. The system according to claim 17, wherein said determined order is one of: in order of increasing frequency and in order of decreasing frequency, in said at least a portion of said plurality of frequency carriers.

20. The system according to claim 17, wherein said sorting is implemented in a Wireless Local Access Network.

* * * * *